(12) United States Patent
Varghese et al.

(10) Patent No.: US 6,449,256 B1
(45) Date of Patent: Sep. 10, 2002

(54) FAST LEVEL FOUR SWITCHING USING CROSSPRODUCTING

(75) Inventors: George Varghese; Srinivasan Venkatachary, both of St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 09/074,277

(22) Filed: May 7, 1998

(51) Int. Cl.$^7$ ............................................... G01R 31/08
(52) U.S. Cl. ...................................... 370/238; 370/351
(58) Field of Search ................................ 370/235, 230, 370/238, 248, 270, 360, 238.1

(56) References Cited

U.S. PATENT DOCUMENTS

| | | | |
|---|---|---|---|
| 3,701,111 A | 10/1972 | Cocke et al. | 340/172.5 |
| 4,464,650 A | 8/1984 | Eastman et al. | 340/347 DD |
| 4,897,814 A | 1/1990 | Clark | |
| 5,261,090 A | 11/1993 | Lien | |
| 5,386,413 A | 1/1995 | McAuley et al. | |
| 5,414,704 A | 5/1995 | Spinney | |
| 5,440,546 A | 8/1995 | Bianchini, Jr. et al. | 370/413 |
| 5,446,887 A | 8/1995 | Berkowitz | |
| 5,459,717 A | 10/1995 | Mullan et al. | |
| 5,613,069 A | 3/1997 | Walker | 370/355 |
| 5,651,002 A | 7/1997 | Van Seters et al. | 370/392 |
| 5,781,772 A | 7/1998 | Wilkinson, III et al. | 370/259 |
| 6,256,295 B1 * | 7/2001 | Callon | 370/254 |

OTHER PUBLICATIONS

Firewalls and Internet Security, William R. Cheswick, et al., 1994, Addison–Wesley, Reading, MA, pp. 71–73.

Building Internet Firewalls, D. Brent Chapman, et al.; 1995, O'Reilly & Associates, Inc., pp. 59–60, 171–176, 329–346.

"Pathfinder: A Pattern–Based Packet Classifier," Mary L. Bailey et al., Proceedings of the First Symposium on Operating Systems Design and Implementation, Usenix Association, Nov., 1994; 9 pages.

"The BSD Packet Filter: A New Architecture for User–level Packet Capture," Steven McCanne, et al., Preprint of paper that was to presented at the 1993 Winter USNIX conference, Jan. 25–29, 1993, San Diego, CA, 11 pages.

"DPF: Fast, Flexible Message Demultiplexing using Dynamic Code Generation," Dawson R. Engler et al., ACM SIGCOMM 1996 Conference paper; 7 pages.

A Search Algorithm for Table Entries with Non–contiguous Wildcarding, Paul F. Tsuchiya, Abstract, undated, 10 pages.

\* cited by examiner

Primary Examiner—Wellington Chin
Assistant Examiner—Brenda Pham
(74) Attorney, Agent, or Firm—Thomas Coburn LLP

(57) ABSTRACT

A new process called "crossproducting" allows level 4 switching to be performed at gigabit speeds. In crossproducting, a database of routing filters or rules is "sliced" into columns corresponding to fields. Each column represents a set of prefixes or ranges. Given a data packet P, a best matching prefix or narrowest enclosing range lookup is performed separately for each packet field. The results of the lookups on individual fields are concatenated to quickly determine the earliest matching rule. The search can be optimized further through such techniques as removing default entries, creating multiple crossproduct tables, caching crossproducts, and early stopping, the latter optimization being made possible by recognizing that it is not necessary in all cases to search all columns for a match. The inventive devices and methods are applicable to various types of networks, including, but not limited to, the Internet and related types of networks, and telephone switching networks.

17 Claims, 14 Drawing Sheets

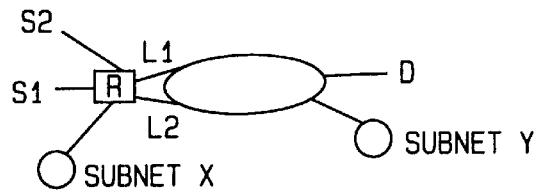
FIG. 1
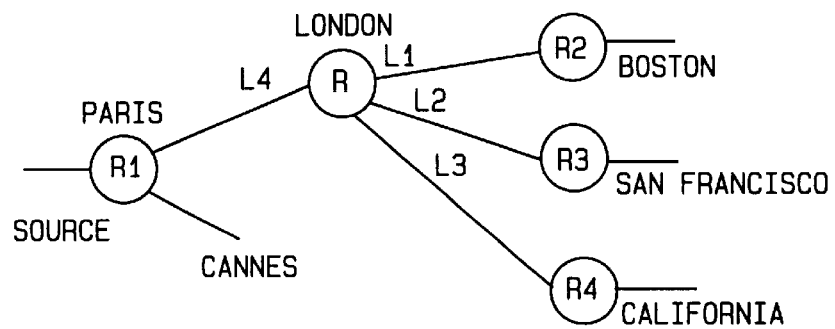
FIG. 2
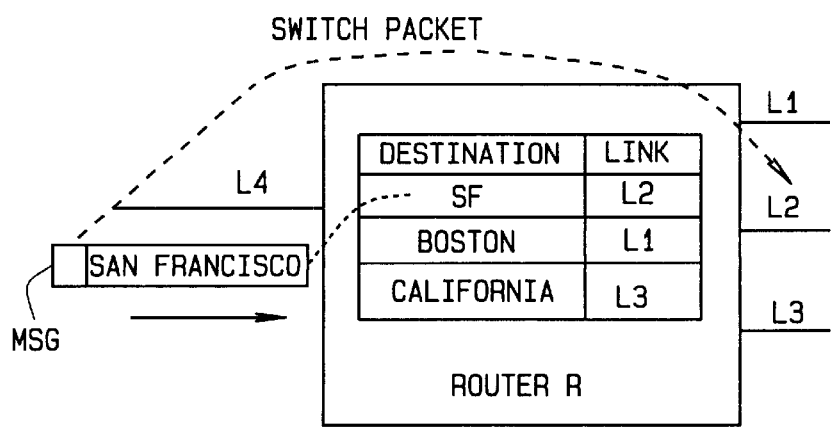
FIG. 3
FIG. 4

P1 = 1*
P2 = 111*
P3 = 11001*
P4 = 10*
P5 = 0*
P6 = 1000*
P7 = 100000*
P8 = 1000000*
FIG. 5
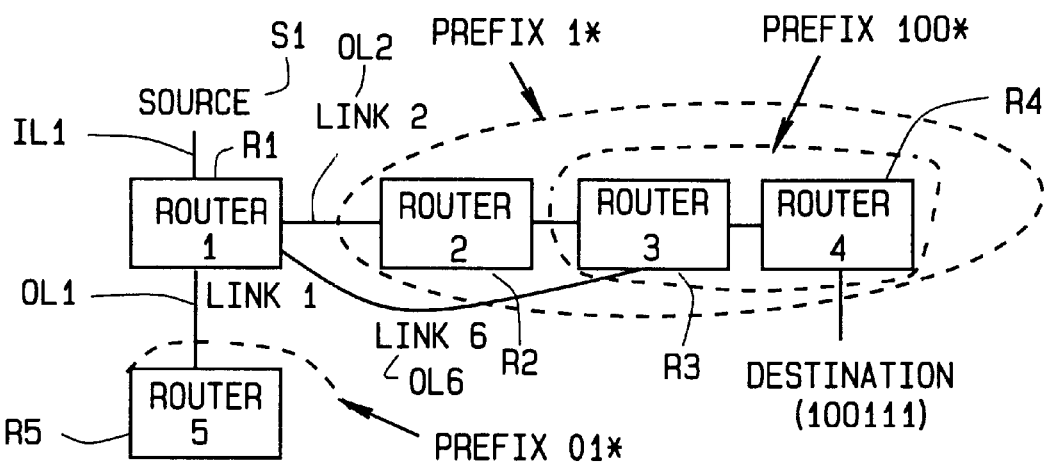
FIG. 6
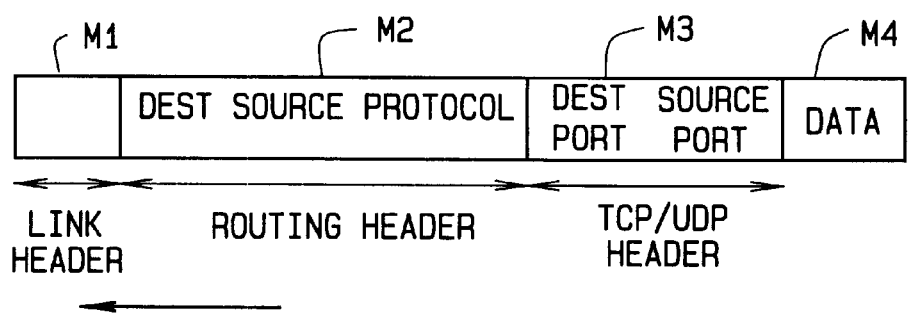
FIG. 7

4 * 4 * 5 * 2 * 3 = 480

| DESTINATION PREFIXES | SOURCE PREFIXES | DSTPORT PREFIXES | SRCPORT PREFIXES | FLAGS PREFIXES |
|---|---|---|---|---|
| M | S | 25 | 123 | UDP |
| T1 | TO | 53 | DEFAULT | TCP-ACK |
| NET | NET | 23 | | DEFAULT |
| DEFAULT | DEFAULT | 123 | | |
| | | DEFAULT | | |

FIG. 11

| DESTINATION | SOURCE | DESTINATION PORT | SOURCE PORT | PROTOCOL | COMMENTS |
|---|---|---|---|---|---|
| M | * | 25 | * | * | ALLOW INBOUND MAIL |
| M | * | 53 | * | UDP | ALLOW DNS ACCESS |
| M | S | 53 | * | * | DNS ACCESS TO S |
| M | * | 23 | * | * | INCOMING TELNET |
| TI | TO | 123 | 123 | UDP | NTP TIME INFO |
| * | NET | * | * | * | OUTGOING PACKETS |
| NET | * | * | * | TCP ACK | RETURN ACKs OK |
| * | * | * | * | * | BLOCK EVERYTHING ELSE |

M IS THE MAIL GATEWAY/BASTION HOST
TI, TO ARE THE INTERNAL AND EXTERNAL NTP SOURCES
S IS THE EXTERNAL SECONDARY DNS SERVER
NET IS THE PREFIX OF THE CORPORATE NETWORK

FIG. 12

| NUM | CROSSPRODUCT | MATCHING RULE |
|---|---|---|
| 1 | M, S, 25, 123, UDP | RULE 1 |
| 2 | M, S, 25, 123, TCP-ACK | RULE 1 |
| 3 | M, S, 25, 123, DEFAULT | RULE 1 |
| 4 | M, S, 25, DEFAULT, UDP | RULE 1 |
| 5 | M, S, 25, DEFAULT, TCP-ACK | RULE 1 |
| 6 | M, S, 25, DEFAULT, DEFAULT | RULE 1 |
| * | * * * * | * |
| * | * * * * | * |
| 479 | DEFAULT, DEFAULT, DEFAULT, DEFAULT, TCP-ACK | RULE 8 |
| 480 | DEFAULT, DEFAULT, DEFAULT, DEFAULT, DEFAULT | RULE 8 |

| DESTINATION PREFIXES | SOURCE PREFIXES | DSTPORT PREFIXES | SRCPORT PREFIXES | FLAGS PREFIXES |
|---|---|---|---|---|
| M | S | 25 | 123 | UDP |
| | DEFAULT | 53 | | DEFAULT |
| | | 23 | | |

3 * 3 * 2 * 2 * 3 = 108

| DESTINATION PREFIXES | SOURCE PREFIXES | DSTPORT PREFIXES | SRCPORT PREFIXES | FLAGS PREFIXES |
|---|---|---|---|---|
| T1 | T0 | 123 | 123 | UDP |
| NET | NET | DEFAULT | DEFAULT | TCP-ACK |
| DEFAULT | DEFAULT | | | DEFAULT |

FIG. 15

FAST LEVEL FOUR SWITCHING USING CROSSPRODUCTING

BACKGROUND OF THE INVENTION

1. Field of the Invention

This invention relates to devices and methods for routing digital communications, and more particularly to devices and methods utilizing crossproducting as an efficient caching strategy.

2. Description of the Prior Art

Internet traffic is exploding both because of a growing number of users and an increasing demand for bandwidth intensive data. While email only contributes small change, big-ticket items such as video and images can easily require megabytes of data to be transferred. To keep up with increased traffic, the speed of links in the Internet core has been increased from 45 MBPS to 155 MBPS, and established vendors as well as many startups are working to build faster routers that can handle Gigabit (1000 million bits per second) links. Thus there is a major market opportunity for high performance routers.

A traditional router that forwards a message has two major tasks: first, looking up of the message's destination address in the router database; and second, internally transferring the message to one of many possible output links. The second task is well understood with most vendors using fast busses or crossbar switches. In the last year, several new solutions have appeared to the message lookup problem as well. Thus there appears to be no impediment to building and selling gigabit routers for data forwarding in the Internet.

Increasingly, however, users are demanding, and some router vendors are providing, a more discriminating form of forwarding called "layer 4 forwarding" in which routing decisions can be based on higher level headers. In traditional terminology, link headers are called "layer 2 headers" and routing headers are called "layer 3 headers." The protocols that ensure reliable delivery use what are known as "layer 4 headers," while applications such as email use what are known as "layer 5 headers" and higher-numbered headers. Traditional routers only look at layer 3 headers in a message; the new breed of routers will, by contrast, base their forwarding decision on layer 3, layer 4, and even higher layer headers.

Layer 4 switching offers increased flexibility for customers. It allows traffic from dangerous external sites to be blocked, allows bandwidth to be reserved for traffic flowing between two company sites in different parts of the country, and it allows important traffic (e.g., database lookups) to be given preferential treatment when compared to less important traffic (e.g., Web browsing). Layer 4 switching allows service differentiation because traffic from a host S1 to destination H can be given better treatment when compared to another traffic host S2 to H. Similarly, web traffic to H can be treated differently from, for example, file transfer to H. Traditional routing does not provide service differentiation because all traffic going to a given Internet address H is treated identically.

While providing these advantages, however, layer 4 switching introduces a number of architectural complications. First, a change in higher layer headers will require reengineering of routers that have traditionally looked at only layer 3 headers. Second, with encrypted higher layer headers for security, it is not clear how routers can get access to higher layer headers.

Despite these problems, various species that fall under the genus of layer 4 switching have already evolved in the industry. First, many routers at trust boundaries, such as the entry and exit points of corporations, implement so-called "firewalls". A firewall database consists of a series of filters on packet headers that implement security policies. A typical policy may be to allow remote login that originates within the corporation but to disallow remote login that originates outside the corporation. Second, the need for predictable and guaranteed service has lead to proposals for filters, for instance, to reserve certain bandwidth between a source and destination networks. Third, the cries for routing based on traffic type have become more strident recently (e.g., route web traffic between site 1 and site 2 on route A and other traffic on route 2). These examples are illustrated in FIG. 1, which schematically illustrates a network that provides traffic sensitive routing, a firewall rule, and a resource reservation, all of which are implemented in router R. A typical set of rules for router R is shown in tabular form in FIG. 2.

In FIG. 2, the first rule in the table routes video traffic from S1 to D via L1; not shown is the default routing to D which is via L2. The second rule blocks traffic from an experimental site S2 from accidentally leaving the site. The third rule reserves 50 MBPS of traffic from an internal network X to an external network Y, implemented perhaps by forwarding such traffic to a special outbound queue that receives special scheduling guarantees. In FIG. 2, X and Y are "prefixes," as defined below.

The major problem that traditional routers face in forwarding an Internet message relates to the process of "address lookup." FIG. 3 is a block diagram of a hypothetical fragment of the Internet linking users in Europe with users in the United States. Consider a source user "Source" in Paris. If this user wishes to send, for example, an email message to San Francisco, the user will send its message to a router R1 which is, for example, in Paris. The Paris router may send this message on the communication link L4 to router R, which may be in London. The London router R may then send the message on link L2 to router R3 in San Francisco; router R3 then sends the message to the destination.

This example shows that a message travels from source to destination alternating between communication links and routers in a manner analogous to the way a postal letter travels from post office to post office using some transportation channel (e.g., an airplane). In the case of a postal letter, each post office decides where to forward the letter in accordance with the destination address that is placed on the envelope containing the letter. In a similar manner, routers must decide to forward a message based on a "destination address" that is placed in an easily accessible portion of the message called a header.

Let us now consider how a traditional router forwards an incoming message by referring to the router R shown in FIG. 3. We show a schematic description of router R in FIG. 4. When a message arrives on link L4, for example, the message carries its destination address SanFrancisco in its message header. Router R is a special computer whose job is to forward all messages that are sent to it towards their final destinations. To do so, router R consults a "forwarding table" (sometimes also called a "forwarding database"). This is a table in the memory of R, which could list each possible destination and the corresponding output link. Thus, when a message to San Francisco arrives on link L4, router R looks up the destination address SanFrancisco in its forwarding table. Since the table says "L2," the router then switches the entire message to the output link L2. It then proceeds to service the next arriving message.

Address lookup and message switching must both be done at very high speeds. The problem of message switching has become very well understood in recent years because of advances in ATM Switching Technology. On the other hand, the problem of address lookup remains difficult because Internet routers store address prefixes in their forwarding tables to reduce the size of their tables. For example, instead of storing every possible address in the United States in a table, router R of FIG. 4 could be configured to store a smaller number of prefix entries, such as USA.CA.SanFrancisco->L2, USA.CA.*->L3, and USA.*->L1, if these were the only rules needed for a particular router. (For readability, routing rules such as those of this example are sometimes presented symbolically in this specification.) However, the use of address prefixes such as USA.CA.* and USA.* makes the lookup problem one of longest matching prefix instead of exact matching. The longest matching prefix problem is considerably more difficult. The current Internet (IPv4, for Internet Protocol, version 4) uses addresses that are bit strings of length 32. The next generation Internet (IPv6, for Internet Protocol, version 6) will use 128 bit addresses. The longer length of IPv6 addresses will only compound the problems of routers.

As a simple example of how a destination address is matched to an entry in a table in a typical prior art router, consider a sample forwarding table of Internet address prefixes such as that shown in FIG. 5. This table will be used, with minor variations, for all of the examples presented herein.

A typical prior art router first extracts the destination Internet address D from the message and finds the longest prefix P in its database that matches D. The router then switches the message to the output link associated with D. Suppose a message to be routed has a 32 bit IPv4 destination address in which the first 6 bits are 101010. The best matching prefix for an IP lookup is the longest matching prefix. Referring to FIG. 5, the best matching prefix is clearly prefix P4, although the first six bits of the destination address also matches prefix P1. Thus any message to such a destination address should be sent to the output link corresponding to P1 (not shown in FIG. 5).

Although routers can use tables such as that shown in FIG. 5 to determine which output link should be used to route a message, traditional routers cannot distinguish between different kinds of traffic going to the same address D. For example, casual web surfing to address D may be far less important than access to a company database at address D. A network manager may wish to give the latter traffic different service (e.g., more bandwidth, less congested routes) than the former. Level 4 switching achieves this differential service by replacing the lookup method used in traditional routers (a best matching prefix lookup on the destination address field) by a more complex lookup method (a best matching filter lookup on a combination of various fields in the message including the destination address, source address, and application classifier fields). Except for this change in the lookup method, the rest of the process remains similar. As before, there is an output link associated with the best matching filter and, as before, the message is switched to that output link. However, in addition, there are two more pieces of information associated with the filter. First, there may be a "block" characteristic associated with the filter that will cause the message to be blocked; this association is useful in implementing firewalls. Second, there may be a specification of an output queue for the corresponding output link; this specification can be used to reserve bandwidth for certain types of packets.

Making the lookup depend on other fields (especially fields that describe the type of application sending the message) permits differential service to be provided to different types of traffic. For example, both TCP and UDP protocols identify destination and source port numbers. For example, most electronic mail uses a protocol known as SMTP where mail is sent to destination port 25. Most file transfers use a protocol known as FTP that is often sent to destination ports 20 and 21. By far the most common application, the World Wide Web, most often sends messages to destination port 80 (or less commonly to easily recognized substitutes like 81, 800, 8000, or 8080). These port numbers can be thought of as being analogous to telephone extensions. Thus, within a given Internet computer D that is has a given Internet destination address, the destination port represents an "extension" of a process within D that should receive a message. Similarly, for a message sent by a source computer S, a source port represents an "extension" of a process within S that sent the message. Analogous to the way different departments (e.g., shipping, billing, and ordering) may be assigned to different extension numbers within a company and provided with differential levels of telephone service, differential service might be provided to network messages, depending upon the port number to which they are addressed, the port number from which they are received, or both. Thus, a simple way to give preference to electronic mail over Web traffic, for example, would be to give more bandwidth to messages sent to port 25 than to port 80. Similarly, replies sent from port 80 could be given reduced priority compared to other traffic. A few of the many other possibilities for providing differential service include distinguishing TCP from UDP and TCP-ACK (TCP acknowledgement) traffic via the protocol field, and recognizing different source addresses to give preferential treatment to traffic depending upon where it originated.

In general the decision on how to forward a message can depend on several fields in the message. Each combination of fields that a manager (or some routing protocol) decides requires special treatment needs to be specified by a rule or a filter. Any fields that are irrelevant in a rule can be wildcarded (i.e., using a don't care character which is traditionally the '*').

In most firewall implementations, the rules are listed in a database in some order; the cost of a rule is the position in the order. Thus the lowest cost rule is the first rule in the database that matches the message. In the general level 4 switching problem, there may be a more general notion of cost.

A level 4 router database comprises N rules or "filters" $R_1 \ldots R_N$. Each rule R is an array of K distinct fields, where R[i] is a bit string. Each field i in a rule is allowed three kinds of matches (although further generalizations are possible to allow more flexibility, it is preferred to keep the examples cited herein as simple as possible while remaining realistic): the field could specify an exact match (for example with the flags field); the field could specify a prefix match (useful especially to block accesses from certain subnetworks that have a common prefix); and finally the field could specify a range match (useful especially to specify ranges of port numbers to block or pass).

More general match capabilities can be specified using a set of bit or symbol values. For example, a filter in a router might specify that only messages to or from even numbered port numbers be forwarded. This forwarding rule would be tedious to specify using only ranges or prefixes, but is easy to specify using rule sets. As will be recognized by those skilled in the art, the invention described in this disclosure easily generalizes to handle arbitrary bit or symbol sets.

Each rule $R_i$ has an associated disposition disposition$_i$ that describes how to forward a matching message. Each disposition may specify that the message be passed or blocked; if it is to be passed it must also specify an outgoing link, and (possibly) a queue within that link for bandwidth reservations. In a firewall configuration, the only interesting value of the disposition associated with a filter/rule is whether the specified traffic type should be allowed or blocked.

Field i of a rule R is defined as matching a packet P if either: a) field i specifies an exact match and R[i]=P[i]; b) field i specifies a prefix match and R[i] is a prefix of P[i]; c) field i specifies a range match and P[i] is in the range specified by R[i], or d) field i specifies a set match and P[i] is in the set specified by R[i]. (The examples herein deal primarily with ranges and prefixes, but easily generalize to set matches.) It is known in the art that range matches and exact matches can be converted into prefix matches, and that longest matching prefix matches are more efficient than range matches. A range match can be converted into a prefix match by adding a small number of extra rules in place of a rule that contains a range match. Any arbitrary range can be rewritten as the union of several prefix ranges. A "prefix range" is a range that can be expressed by a prefix. For example, for 4 bits, the prefix 10\* expresses the range [1000, 1011]=[8,11]. Thus, the range [8,12] can be expressed as the combination of the two prefix ranges 10\* and 1100. However, in some important cases, as in the case of destination and source port numbers of 16 bits, it is easy to do range matches using an array of $2^{16}$ elements that maps each possible port number to its corresponding range match.

It is easy to convert a set of N filters with overlapping ranges to an equivalent set of 2N filters with non-overlapping ranges. For example, consider 3 filters that have only destination ports specified. Filter F1 specifies a range 1 . . . 5, Filter F2 specifies a range 2 . . . 3 and Filter F3 specifies a range 3 . . . 4. Since the three original ranges overlap, these can be rewritten as a set of 4 non-overlapping ranges: 1 . . . 2, 2 . . . 3, 3 . . . 4 and 4 . . . 5. Filter F1 then needs to be rewritten as 4 equivalent filters; Filter F2 and F3 remain unchanged. In the worst case, rewriting filters in this way can add more filters than when one converts all ranges to prefixes. It is an implementation choice whether to convert naively to non-overlapping ranges or convert to prefix ranges.

A packet P is defined as matching rule R if for all K packet fields P[i] matches field i in rule R. The packet filtering problem is defined as finding the first (i.e., the rule $R_i$ with the smallest value of i) rule that matches a given packet P and to forward the message according to the manner specified in dispositions.

Finding the first matching rule is important because packet headers can match multiple rules. Default rules (such as "block everything not specified") are specified at the end. It is not acceptable for a filtering implementation to reorder the rules for improved performance. (See B. Chapman et al., *Building Internet Firewalls*, O'Reilly and Associates, November, 1995.) Consider again the table shown in FIG. 5, which was considered in an earlier IP lookup example. For an IP lookup of an address having 101010 as the first six bits, the best match is defined in terms of the longest length. Thus, the filter having IP address prefix P4 is the best match for an IP lookup. However, other types of filters, the best match may be defined in terms of a lowest cost match (where the cost may be set by a manager) or the first filter matched. Firewalls (such as in the examples presented in Chapman) pick the first filter in the database that matches, assuming that the filters are entered in some specified order by the manager. Thus, in a firewall, the best match in the table of FIG. 5 to an address having 101010 as the first six bits is the filter having IP address prefix P1, even though address prefix P4 is a longer match.

Existing implementations of firewalls do a linear search of the firewall rule set until a match is found. Some implementations also cache full packet headers to speed up the processing in some cases. Caching of even just destination addresses has been found to have at most a 90 percent hit rate (P. Newman, et al., "IP switching and gigabit routers, "*IEEE Communications Magazine*, January 1997), however, and the cost of linear searching in the remaining 10 percent of the cases is high. It would therefore be advantageous if faster devices and methods for searching a database having the characteristics of a rule set for a router or firewall were available. It would be especially desirable if such devices and methods were capable of providing increased flexibility for routing, including the capability of differential handling of traffic at high traffic loads.

BRIEF DESCRIPTION OF THE INVENTION

It is therefore an object of the invention to provide devices and methods for rapidly routing data packets through a router, including a firewall.

It is a further object of the invention to provide devices and methods for rapidly solving the problem of finding a best matching filter for a data packet.

It is yet another object of the invention to provide devices and methods for providing increased flexibility for routing data packets through a router.

It is still another object of the invention to provide devices and methods for the differential handling of message traffic in digital networks at high traffic loads.

It is a still further object of the invention to provide devices and methods for rapid IP lookup in applications such as Internet routing.

In accordance with one aspect of the invention, there is thus provided a method for routing a data packet applied to an input port of an electronic router, the data packet including routing information comprising at least a destination address field containing a destination address, and the electronic router having a plurality of outputs each corresponding to an output data link, and a routing database including filter entries each having a corresponding cost and an associated output data link, said method comprising the steps of: a) operating the router to perform a crossproducting search on the routing information included in the data packet to find a least-cost matching filter in the routing database and its corresponding output data link; and b) routing the data packet to an output of the router corresponding to the output data link found in the crossproducting search.

When the routing information comprises a plurality of routing fields including the destination address field; the routing database comprises a plurality of sub-databases and a crossproduct database, each sub-database corresponding to a different routing field of a data packet and including prefix filters encompassing all possible values of a routing field corresponding to the sub-database; and the crossproduct database comprises a database of output data links corresponding to crossproduct terms of prefixes contained in the crossproduct database, operating the router to perform the crossproducting search may comprise: searching for one of a longest matching prefix or a narrowest enclosing range for each routing field in the data packet in sub-databases corresponding to the routing fields, each search producing a search result; concatenating the search results into a crossproduct term; and searching for an output link corresponding to the crossproduct term in the crossproduct database.

A further refinement of the above method includes the steps of determining whether the search for the output link corresponding to the crossproduct term fails to find an output link; if no output link was found, computing an earliest matching filter associated with the crossproduct term; and associating an output link corresponding to the earliest matching filter found in the computing step with the crossproduct term in the crossproduct database.

There are also provided additional optimizations of the above methods including an early stopping optimization to reduce storage requirements, and methods of caching crossproducts to provide enhanced speed.

Also provided, in accordance with another aspect of the invention, is a routing system for data packets having a plurality of fields, the routing system comprising: a plurality of input data links for receiving incoming data packets; a plurality of output data links for dispatching outgoing data packets; a switch interconnected between said input data links and said output data links and adapted to selectively connect one of said input data links to one of said output data links; and a data processor coupled to said adjustable switch and having means for controlling said switch, said data processor including a database of filters each having an associated filter cost, and each of said filters having a prefix on a set of selected packet fields and an association with an output data link for routing an incoming data packet, said data processor also including means for accessing said database for matching of data packet fields with said filters in said database, said means for controlling said switch being responsive to a match of said data packet fields with one of said filters in said database to thereby route a data packet received at an incoming data link to a corresponding output data link. The accessing system of the routing system may include means for performing a crossproducting search to match fields in a received data packet with an earliest matching filter.

Also provided in accordance with other aspects of the invention and described in detail herein are methods for creating databases for routing data packets, including one such method in which a plurality of arbitrary filters are provided, each comprising one of a prefix or non-overlapping range for each field of the data packets to be searched, so that each of the prefixes or non-overlapping ranges becomes a filter specification, and each of the filters further comprises an output link specification. The method comprises the steps of: placing all of the filter specifications for the fields of the data packets corresponding to each filter in sub-databases corresponding to each field of the data packets, building each sub-database corresponding to each field of the database into a query-matching database having query-matching entries; matching fields of received data packets to entries in the sub-database to generate crossproducts from the query-matching entries; and caching a set of most recently generated crossproducts.

The invention in all of its various aspects will be better understood by those skilled in the art with reference to the detailed description below and the accompanying drawings.

BRIEF DESCRIPTION OF THE DRAWINGS

FIG. 1 shows representations of filters that provide traffic sensitive routing, a firewall rule, and resource reservation;

FIG. 2 is a table representing a typical set of routing rules for the schematic network representation in FIG. 1;

FIG. 3 is a drawing of a hypothetical fragment of the Internet linking users in France with users in the United States;

FIG. 4 is a simplified functional representation of a router;

FIG. 5 is a sample forwarding table comprising IP address prefixes;

FIG. 6 is a representation of a typical data communication or telephone network that uses prefixes to reduce the size of forwarding tables;

FIG. 7 is a representation of a message header that can be used by routers to forward an associated message, the message header containing a routing destination, a source address, a protocol field, and a transport header with port numbers;

FIG. 11 is a representation of a database "sliced" into columns so that each column contains a set of prefixes corresponding to a particular field;

FIG. 12 is a representation of a sample firewall database for a small company (excluding disposition values) in which the first seven rules allow the specified traffic to go through and the last blocks all remaining traffic;

FIG. 13 is a sample of the crossproducts obtained by crossproducting the individual prefix tables of FIG. 12;

FIG. 15 is a representation of how the database of FIG. 11 can be split into two databases, so that the crossproducts of each can be found separately, resulting in a smaller number of crossproducts than in FIG. 12;

DETAILED DESCRIPTION OF THE PREFERRED EMBODIMENTS

Figure 8:
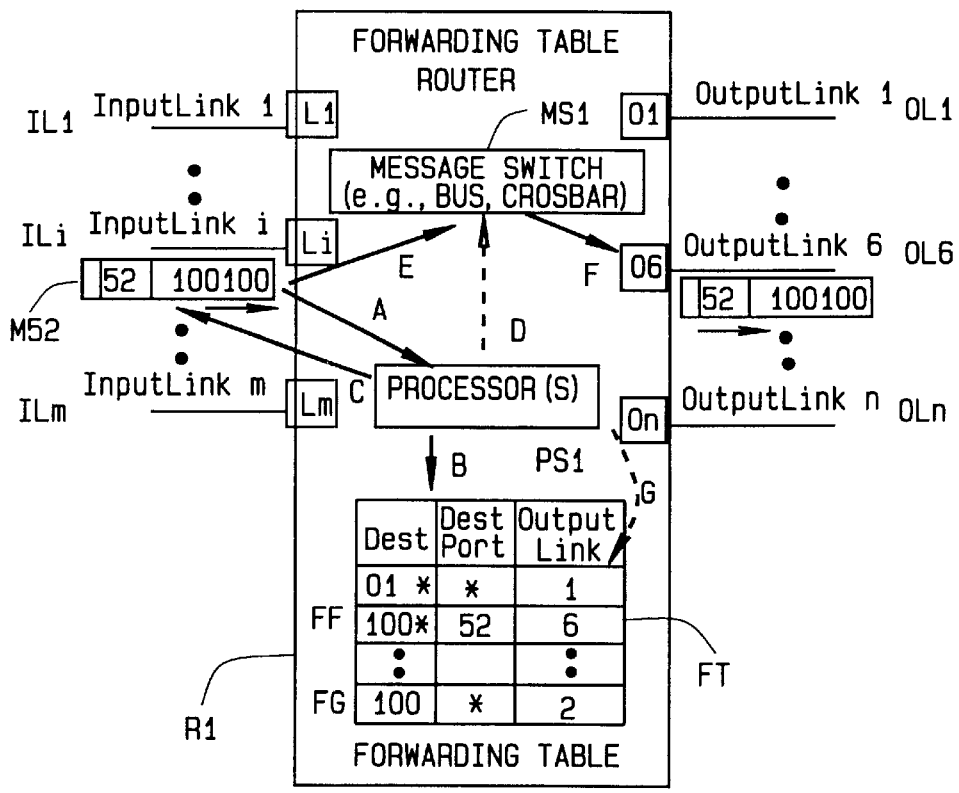
FIG. 8 is a representation of a router in accordance with the invention.

Although the invention is sufficiently general to be used in other contexts requiring a fast best matching filter, it is described here, without loss of generality, in the context of a communication network that is used to forward messages (e.g., the Internet) or calls (e.g., a telephone network). FIG. 6 is a simplified block diagram of a typical data communication network. Routers are connected by communication links such as fiber optic links, Ethernet links (which can connect more than one router), satellite links, etc. that allow a message to be sent directly between two routers. Telephone networks are similar, except that messages are replaced by telephone calls and routers are often referred to as telephone switches. For the rest of this description, the data communication network terminology will be used, but it should be remembered that the invention is applicable to other types of networks (such as telephone networks), as well.

FIG. 7 shows the format of a message sent by the source to a destination. The front of the message M1 contains a link level header, followed by a routing header M2 that is examined by routers. The routing header M2 contains the destination address of the intended recipient, typically encoded as a binary number of 32 bits, a source address (32 bits) and a protocol field. The routing header also contains other fields such as a visit count and other fields that vary in different routing protocols. If the protocol field is either TCP or UDP, the TCP/UDP protocol have an additional header M3 that contains a destination port (16 bits) and a source port (16 bits) field. Following the routing header M2 (or M3) is the data M4 being communicated.

Messages are forwarded by looking up the message header fields in a forwarding table to determine the output link, and then by forwarding the message to the corresponding output link. In order to reduce the size of forwarding tables, and for flexible policies, the forwarding table comprises a set of "filters." Each filter may specify prefix fields for destination and source addresses, and sometimes for the port number fields. An address prefix represents a group of hosts whose addresses all begin with that prefix. For example, in FIG. 6, Routers R2, R3 and R4 and the destinations they serve are described by prefix 1*, where '*' represents a wild card (i.e., anything beginning with '1' is matched). Prefixes may be nested within other prefixes. In FIG. 6, routers R3 and R4 can reach the prefix 100*, which is contained wholly within the group covered by prefix 1*.

A router forwarding table will store a corresponding output link to reach every filter that it knows about. (This information is obtained using various routing update protocols). To forward a message, the router must lookup its forwarding table for any filters that match the headers in the message. If more than one filter matches, the router picks the filter that occurs first. FIG. 6 is only an extremely simple example of a routing network or internetwork, however, the inventive methods clearly apply to other combinations of headers and other networks and network protocols built along similar principles that use best matching filter forwarding.

The workings of a router can now be described. A router (FIG. 8) comprises input links IL1 through ILm, and corresponding output links OL1 through OLn (in most, but not in all cases, a router has the same number of input and output links). Corresponding to each input link there is a link interface (L1 through Lm) and corresponding to each output link there is a link interface (O1 through On). Each link interface contains the circuitry to send and receive messages on a particular link, and (possibly) buffers to store messages temporarily before they are forwarded.

The two other main components of a router are a message switch subsystem MS1 and a processing subsystem PS1. The processing subsystem PS1 could be a single processor, group of processors, a processor per link, or various hardware state machines. The message switch subsystem MS1 is responsible for switching a message from an input link interface (e.g., L1) to an output link interface (e.g., O6) under command from the processing subsystem PS1. Typical message switch subsystems MS1 contain one or more computer busses, a crossbar switch, or more sophisticated switching systems. In some routers the switching subsystem function is performed by one of the processors; in some cases, it is done by independent hardware.

A typical process for forwarding a message is as follows. When a message arrives at, for example, input link ILi, it is stored in the corresponding link interface Li. Some time later, a processor in the processing subsystem PS1 reads the header fields (a process indicated by arrow A in FIG. 8), then does an header lookup (arrow B). The result of the header lookup specifies the output link corresponding to the longest prefix match and the forwarding disposition disposition. If the disposition specifies that the message be dropped (e.g., to implement firewalls) that is done. If not, the message is forwarded according to disposition to an output link. For example, disposition may also specify which queue to be used for this message and the amount of bandwidth to be reserved for this type of message.

Some fields in the message are then updated, e.g., often a visit count is incremented and the link headers are sometimes updated (arrow B). Finally the message is switched (arrows D, E, and F) to the specified output link (e.g., OL6). This is done by the processor PS1 specifying the details of the message, input and output links to the switching subsystem (arrow D). The switching subsystem then actually transfers the message (arrows E and F).

For example, a message M52 sent to destination address that starts with 100 and port 52 is matched to filter FF in forwarding table FT and is therefore switched to output link OL6 in accordance with the instructions in forwarding table FT. Returning to FIG. 6, it will be appreciated that a message from a source to a destination is sent by having each router in the path perform a similar function.

Periodically, when the router gets new routing updates from other routers, the router may rebuild its forwarding table to add or delete some filters FG (as indicated by arrow G).

According to one aspect of the invention, the header lookup (arrow B) is made an order of magnitude faster than existing methods. This improvement involves both the step of table building and the step of address lookup.

Figure 9:
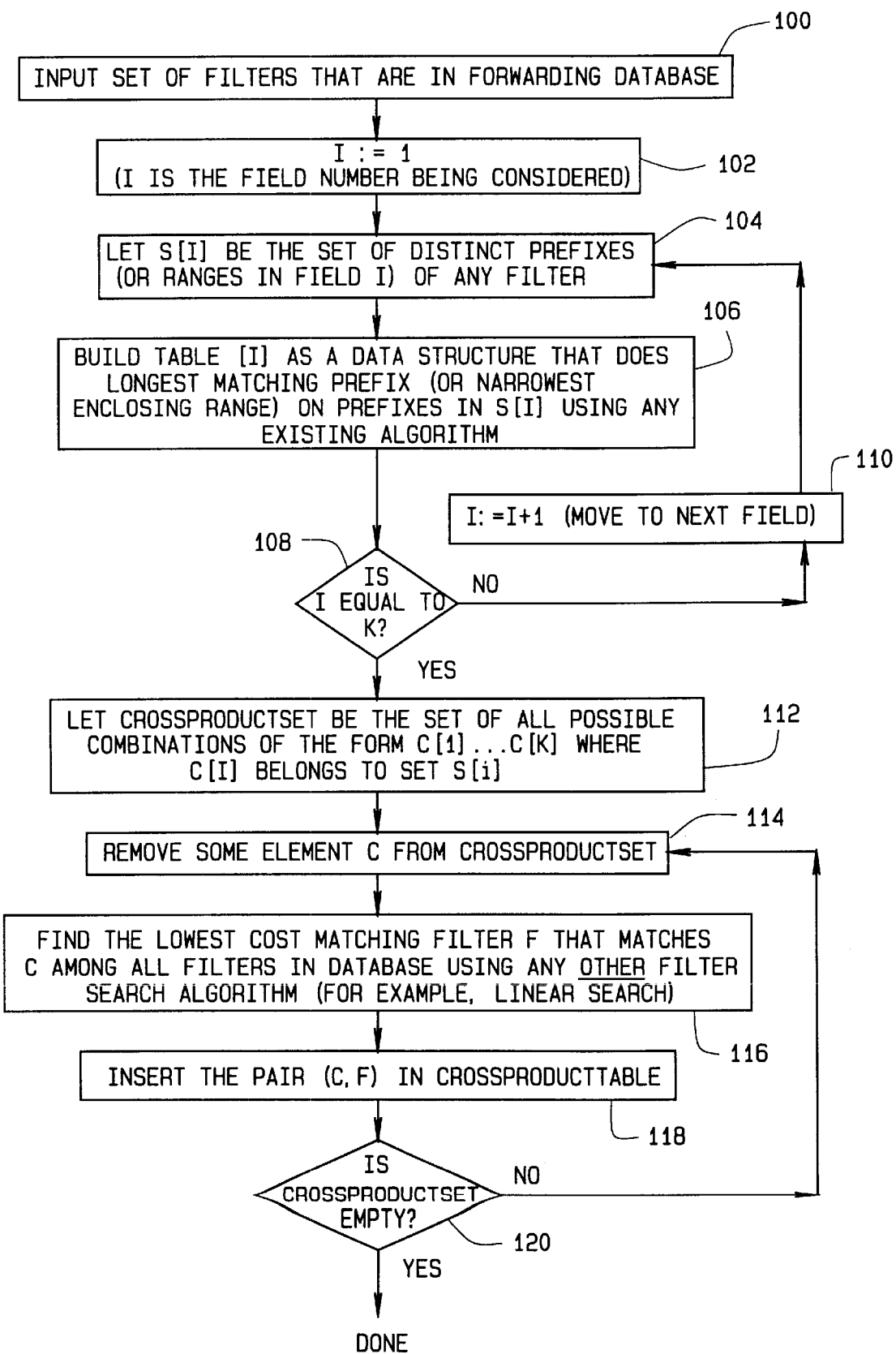
FIG. 9 is a flow chart describing the process of building data structures applied by a simple crossproducting search procedure on filters to compute a best matching filter of a data packet.

Referring now to FIG. 9, in accordance with the invention, the router builds a data structure Table[I] that will allow "sliced" prefix or range lookups for each field I of the filter database in forwarding table FT. To do so, from the set of filters that are in the forwarding database at block 100, the set S[i] of all possible values in field i in the prefix database are calculated in blocks 102, 104, 106, 108 and 110.

Figure 10:
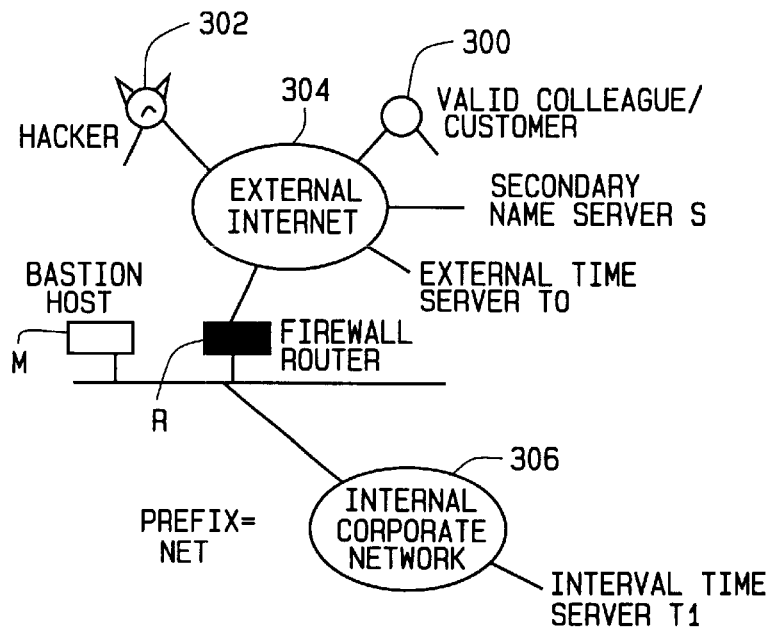
FIG. 10 is a representation of a typical small corporate network employing a firewall.

To better understand "slicing," consider, without loss of generality, a simple example of a corporate network employing a firewall, as shown schematically in FIG. 10. In FIG. 10, internal corporate network 306 must be accessible to a valid colleague or customer 300 through an external internet 304. However, undesired users such as hacker 302 can also access the external internet 304, and through it, may possibly be able to access internal corporate network 306. To prevent this from occurring, a firewall router R is provided to allow desired communications between the internal corporate network 306 and valid users 300 (as well as other valid communications between bastion host M, secondary name server S, external time server TO, and internal time server TI, for example) and to disallow hacker 302 from accessing the internal network 306. It is assumed, in this example, that mail across firewall R has to go through the bastion host that acts as an intermediary between the outside world and the company. Each network must also provide something called DNS (Dynamic Name Service), which is analogous to directory assistance in telephones. It is assumed here that "directory assistance" calls from outside corporate network 306 go through bastion host M. In addition, the Internet has a time synchronization protocol called NTP that synchronizes the clocks of all computers in corporate network 306. To allow NTP to operate, firewall R must allow time information to flow from an external time provider TO to an internal time provider TI. Also, it is assumed that all the IP addresses within the corporate network start with a prefix represented by the symbol Net.

Rules that might be implemented by firewall router R in FIG. 10 are listed symbolically in FIG. 11. As usual, the * character represents a wildcard that matches any field. (In FIG. 11, the abbreviation M stands for the address mail gateway/bastion host M; TI and TO represent the addresses of the internal and external NTP sources TI and TO respectively; S is the address of an external secondary DNS server S; and Net is the prefix of the corporate network. The disposition values are not shown.) The first seven rules allow the traffic types specified in the comments. For example, the first rule allows inbound mail access and the fifth rule allows the Network Time Protocol (NTP) to operate. The sixth rule allows all traffic originating from the corporate network 306 to go to the Internet 304, and the seventh rule allows acknowledgement received from the external internet 304 to enter. The last rule is the only blocking rule. It blocks all traffic not specified by the first seven rules. For example, consider a packet sent from M to S with UDP destination port equal to 53. This packet matches the second, third, and eighth rule, but must be allowed through because the first matching rule is the second rule, which has disposition block=false (not shown in FIG. 11.

The database is "sliced" into columns corresponding to fields. Each column now represents a set of prefixes. Given a packet P, a best matching prefix lookup on each packet field can always be performed separately using existing algorithms. Suitable methods, provided by way of example only, are given in Turner et al., U.S. pat. app. Ser. No. 08/926,370 entitled "Scalable High Speed IP Routing Lookups," filed Sep. 9, 1997, and Varghese et al., U.S. pat. app. Ser. No. 08/821,100 entitled "Method and Apparatus for Fast Hierarchical Address Lookup Using Controlled Expansion of Prefixes," filed Mar. 20, 1997.

The database of FIG. 12 is sliced into individual best matching prefix fields. Hereinafter, in the sliced columns, the wildcard character * will be referred to by the string default. It will be assumed that the mail gateway M and internal NTP agent TI are full IP addresses that lie within the prefix range of Net. The sliced database is shown in FIG. 11.

The number of elements in the column is indicated at the top of each sliced column. Since there are 4 in the first and second columns, 5 in the third, 2 in the fourth, and 3 in the fifth, there are exactly 4*4*5*2*3=480 possible 5 tuples formed by all possible combinations of the values in each column. These are called crossproducts. Some sample crossproducts are shown in FIG. 13. If the destination field is considered to be most significant and the flags field the least significant, and values are deemed to increase down a column, the crossproducts are ordered from least to the greatest, as in any number system.

Given a packet P, if a best matching prefix operation is performed for each field P[i] in the corresponding sliced prefix database, and the results are concatenated to form a crossproduct C, then the earliest matching rule corresponding to P is the earliest matching rule corresponding to C. In other words, whenever the rule set is changed, the values of all possible crossproducts and their corresponding earliest matching rule can be precomputed. A sampling of the resulting crossproduct table is shown in FIG. 13.

The best matching rule can now be found for a packet using K best matching prefix operations plus a single hash table lookup of the crossproduct table. Whenever a column contains no prefixes (except for the wildcard character), the best matching prefix lookup can be replaced by an exact match. Further, for small databases of less that 5,000 filters, the individual column databases will often fit into cache (in software) or static RAM (in hardware). Thus there will be K or fewer cache accesses (early stopping, as described herein, can result in fewer than K cache accesses) followed by one lookup to slow memory (for the hash lookup of the crossproduct table). This can translate to extremely fast performance. Notice that the speed is independent of the number of rules in the database.

As an example of a lookup in FIG. 11, consider a packet sent to M from S with UDP destination port equal to 53 and source port 57. The best matching prefix in the destination column of FIG. 11 yields M (it matches Net as well, but M is a longer match); the source field longest match is S, the destination port is 53, the source port lookup yields default, and the flags field yields UDP. Thus after 5 best matching prefix operations (of which only 2, the source and destination addresses are the only ones that require a best matching prefix in this example), the crossproduct is found to be M, S, 53, default, UDP.

It is not hard to see that the precomputed earliest matching rule for this crossproduct is Rule 2 (although it matches Rules 3 and 8 as well). Assuming this mapping is in the crossproduct table shown in FIG. 13, a simple lookup of the crossproduct table (keyed by the concatenation of the cross product fields) yields the correct rule for the packet.

Crossproducting works correctly because it can be shown that for any packet P and its associated crossproduct $C=M_1 \ldots M_K$, the best matching filter of C is the best matching filter of P. Thus, if the best filter associated with each crossproduct C is precomputed, the best filter associated with any packet that has crossproduct C can be found immediately.

In simple crossproducting there is one additional step. All possible crossproducts of the "sliced values" in each of the fields are calculated at block 112. (see FIG. 9.) All of these values are placed in a set CrossProductSet. The lowest cost matching filters F for each crossproduct C in this set are then calculated in blocks 114, 116, 118, and 120. This calculation need not be done by crossproducting; in fact, it can be done by any other lowest cost matching filter procedure other than crossproducting. The simplest such procedure at block 116 is a linear search among all filters to see those that match C and then picking the earliest filter that matches C. This linear search procedure is extremely slow but recall it only has to be done when filters get added or deleted, where a slower procedure to build the data structure can be tolerated.

So far, it has been assumed that the earliest matching filter is the best matching filter; in general, a cost could be associated with each filter and choose the lowest cost matching filter. The flowchart refers to the general case. At block 118, the pair (C, F) is inserted into a data structure CrossProductTable. This is a data structure which can be looked up using a value of C to find the associated value of F. The simplest implementation would be a hash table.

Figure 14:
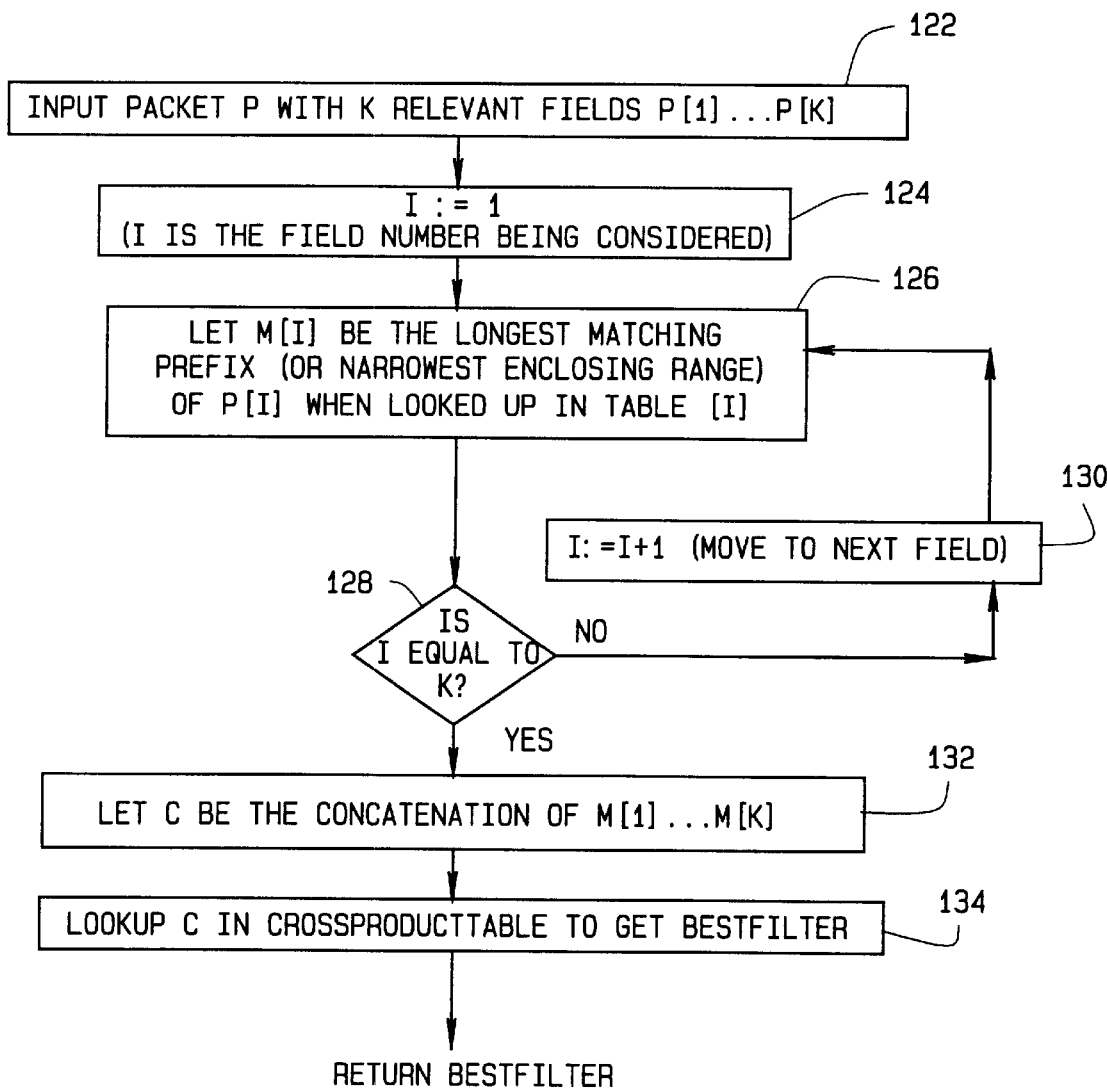
FIG. 14 is a flow chart describing a simple crossproducting search procedure on filters to compute a best matching filter of a packet.

Having built the structure, the best matching filter for a packet P can now be found. The flow chart is shown in FIG. 14. A packet P with K relevant header fields is input at block 122. First, the best matching prefix (or narrowest enclosing range) M[I] is found when each packet field P[I] is looked up in Table[I] at blocks 124, 126, 128, and 130. This is done for all K packet fields. Those fields are then concatenated to form the crossproduct C at block 132, and the answer is looked up in the CrossProductTable to get the best matching filter at block 134.

A problem with naive crossproducting is that the storage for the crossproduct table can grow as $N^K$ where N is the number of rules and K is the number of fields considered. For example, with N=100 and K=5, there could be as many as $10^{10}$ crossproduct table entries. One could argue that this worst case is unlikely to happen, because it occurs only if every rule has a unique prefix in every field. However, even the worst case memory requirements can be reduced to practical limits by a series of optimizations.

One of these optimizations concerns range matching. If the ranges in a column are non-overlapping, they can always be split into non-overlapping ranges. Once all the ranges are non-overlapping, a longest prefix matching operation within a column can be replaced by a matching operation for the narrowest enclosing range. Some columns will return a longest prefix match and others a narrowest enclosing range. The crossproduct is taken to be the concatenation of all these matches as before and look up the result in the crossproduct table. The procedure works correctly for the same reason as above. Because of this essential similarity, it will be understood that any longest prefix match can be replaced by a narrowest enclosing range match.

The simplest optimization is to notice that the majority of entries in the crossproduct table of FIG. 13, for example, come from the Default Rule, Rule 8. All the crossproducts that map to a single rule R can be removed from the crossproduct table. If the hash table search fails, it can always be assumed that the matching rule is rule R. This rule should be a rule that contributes the most crossproducts, the default rule being an obvious candidate.

An alternative and intuitive way of understanding this optimization can be provided. Consider a rule like Rule 3 in FIG. 12 which can be written as (M, S, 53, *, *). The * entries can be expanded replacing them with all possible values that match that particular field. Since there are 2 possible values for field 4 in FIG. 12, and 3 possible values for field 5, Rule 3 expands to the 6 rules:

(M, S, 53, 123, UDP) , (M, S, 53, 123, TCP-ACK) , (M, S, 53, 123, default), (M, S, 53, default, UDP), (M, S, 53, default, TCP-ACK), (M, S, default, 123, default), Notice, however, that a prefix like Net will only expand to the other fields that match Net (for instance M and TI, and not default). If this expansion is done for all rules except the last default rule, the same crossproducts will be obtained. It is easy to show that the resulting storage is the sum of Num(j, 1)*Num(j, 2) * . . . Num(j, K) for j=1 to N, where Num(j, i) is the number of other fields in Column i that are matched by Field i in Rule j. A quick computation for the database of FIG. 11 shows that this simple trick reduces the number of crossproducts from 480 to 223, roughly a factor of 2.

Pseudocode for crossproducting after removing (for example) the default rule is shown below:
FirewallSearch(P) (* called on arrival of packet P *)
    For i=1 . . . K
        $M_i$:=PrefixLookup(P[i], PrefixTable[i]);
    C:=$M_1$ $M_2$ . . . $M_K$; (* crossproduct for P *)
    R:=(HashLookup(C, CrossProductTable))
    If R=nil then (*not in table*)
        Return (Default Rule)
    Else Return (R);

Even for other filter search algorithms, the intuitive expansion described above can be used to reduce the complexity of other search algorithms by completely eliminating one or more fields from the filter lookup process. Since complexity is proportional to the number of fields, this can be a big help in practice.

For example, in TCP/IP since the Protocol field has only two values (TCP or UDP) for which ports matter, any entry that has a wildcard (i.e. a '*') in the Prot field can be replicated three times. The three values will correspond to "TCP," "UDP," or "OtherProtocol". When the header is parsed, the Protocol field is replaced by one of these 3 values. It can be shown that this transformation allows replacement of a possibly wildcarded field by a fully specified field with a storage increase of at most 3. This reduces the number of filter combinations to be searched by any other algorithm.

The general idea of eliminating one or more fields by expanding the filter database by replacing each entry E (by all other entries in the same column that are compatible with E) is called "partial crossproducting" in this description. It can be used as a preprocessing step to speed up any other algorithm. The number of fields to be eliminated can be chosen as a tradeoff between memory and speed.

A further optimization to reduce cross product storage is to logically or physically partition the original rule database into two or more segments. For example, consider the partitioning of the rule database of FIG. 12 into two segments, one containing Rules 1 through 4, and the other containing Rules 5 through 8. Crossproducts are then calculated for each segment separately. This partitioning reduces memory considerably. Comparing FIG. 15 and FIG. 11, it will be seen that the number of crossproducts has been reduced from 480 to 120.

At first glance, this partitioning approach appears to slow down the search time considerably, because the simplest way to do the search would be to do K best matching prefixes in each segment, calculate the crossproduct result for each segment, and then do two hash lookups in two crossproduct tables to get at most two matching rules, one from each segment, and then choose the rule that appears earliest. This would imply that halving the database would exactly double the number of lookups. Surprisingly, this turns out not to be the case. Best matching prefix lookups based on the union of both segments can still be performed as before, however, each result now gives two values, the best matching prefix for each segments. For example, in FIG. 15, the destination address M would yield a best matching prefix of M in segment 1 and Net in segment 2.

Because it is easy to pack two or more values into a memory word or a cache line, accessing two values does not cost significantly more than reading one value.

However, two hash lookups must be made in the crossproduct table. Thus this optimization increases the number of hashes from 1 to 2 but does not change the number of best matching prefix lookups; the resulting storage savings can be large even in the worst case because $2(N/2)^K < N^K$.

To do the default entry removal optimization described above, the building process would be modified so that it removed all crossproducts associated with the default entry. The search process would also be modified so that if a search for a crossproduct in CrossProductTable produces no answer, then the default value is returned. Flow charts for these modifications are not provided because of their simplicity. Moreover, this optimization is not compatible with the more important on demand crossproducting, and so it is not considered further.

For large rule sets of the order of 1000 rules, further optimizations are required, as the memory needs grow larger. A much more powerful optimization technique is to build the cross products on demand rather than precompute them.

In "on demand crossproducting", the prefix tables for each field are built as usual, but the cross-product database is not precomputed. Thus, when a packet P arrives that yields a new cross product term C, looking up C in the crossproduct database will not result in a match.

With on demand crossproducting, the lack of a crossproduct is not taken to mean that the default rule applies. Instead, it is taken to mean that information about C has not yet been determined. In that case, a slow linear search is performed to find the rule matching C, which is then inserted into the crossproduct table. Subsequent packets that yield crossproduct C will yield fast lookups, because the corresponding entry will have been placed in the crossproduct table as a result of the prior search. It should be observed that the "on demand crossproducting" optimization technique is incompatible with the optimization technique of removing default entries.

On demand crossproducting can greatly reduce the build time and storage requirements needed for a routing database, because it is not necessary to compute all possible cross products, and not all possible crossproducts are likely to occur in practice.

The data structure building for on demand crossproducting (shown in the flow chart of FIG. 16) is similar in many respects to simple crossproducting shown in the flow chart of FIG. 9. The data structures Table[I] are still built as before. However, the complete CrossProductTable is not built as before, relying on the fact that most crossproducts will not be needed. Therefore, entries are added to the CrossProductTable only when a packet having an entry not yet in the table is received.

Figure 17:
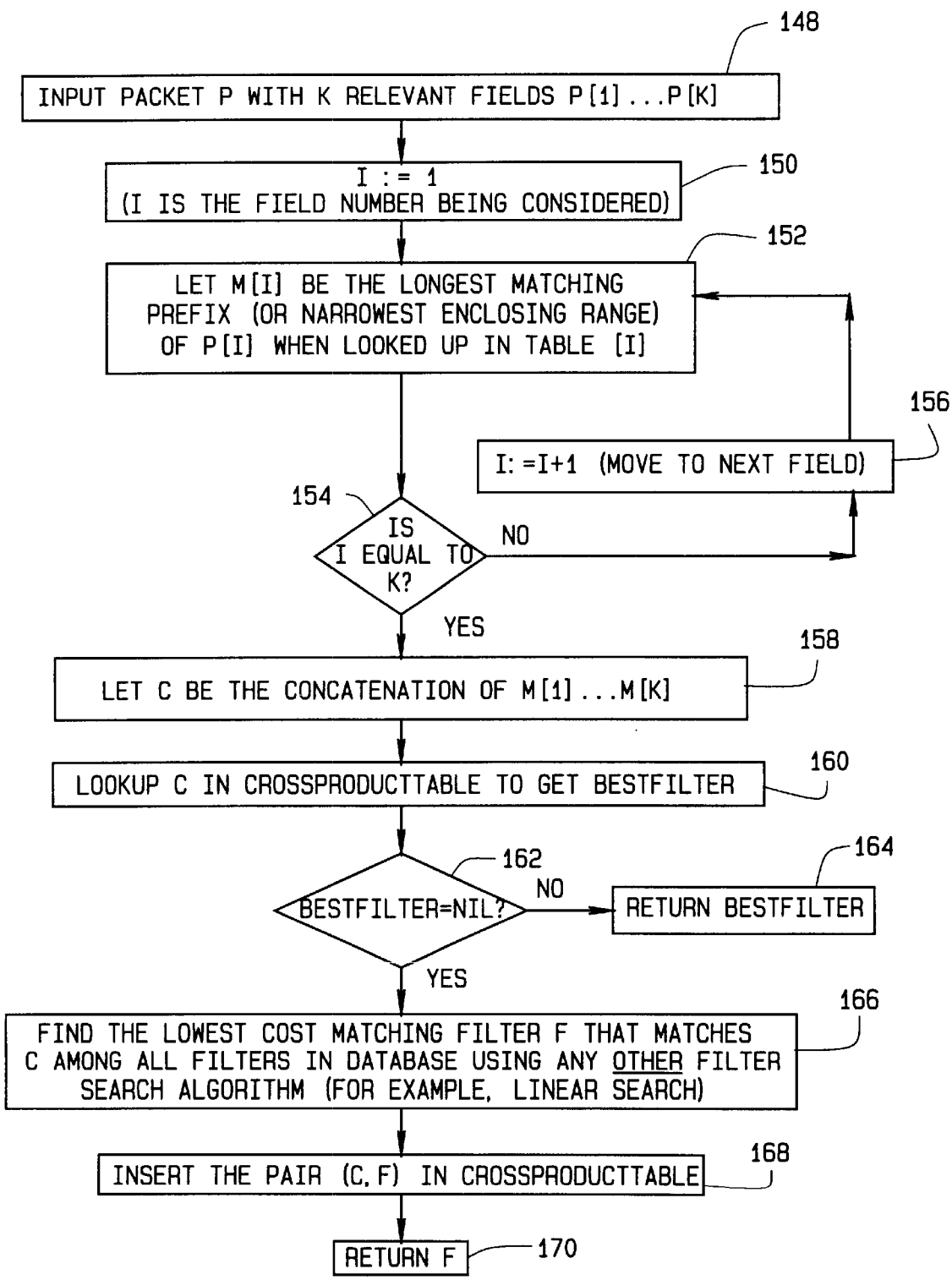
FIG. 17 is a flow chart describing the crossproducting search procedure on filters to compute the best matching filter of a packet when using on demand computation.

The new search procedure shown in the flow chart of FIG. 17 starts off similarly to the simple search procedure of FIG. 14. As before, the crossproduct corresponding to packet P is found in blocks 148, 150, 152, 154, 156, and 158. The only difference comes in looking up the result in CrossProductTable at block 160 and subsequent blocks. In the simple case, it is guaranteed that a result will be found; in the on demand algorithm, the cross product result may not yet be inserted. The value Nil is used in FIG. 17 to indicate that there is no result at block 162. If the value is not equal to Nil, the result is simply returned at block 164 (fast path); if the value is Nil, the cross product building steps shown in blocks 166 and 168 are performed, essentially performing the steps in blocks 114, 116, and 118 in FIG. 9 to find the best matching filter for C and insert it into the table (slow path). This filter is returned at block 170.

As noted previously, the calculation of the best matching filter must be done by some other (possibly slow) procedure. However, this calculation is done only once for a number of packets that all map into the same crossproduct. Thus, this process is essentially a form of caching. Processing of the first packet is slow, but the remaining packets follow the fast path.

Figure 16:
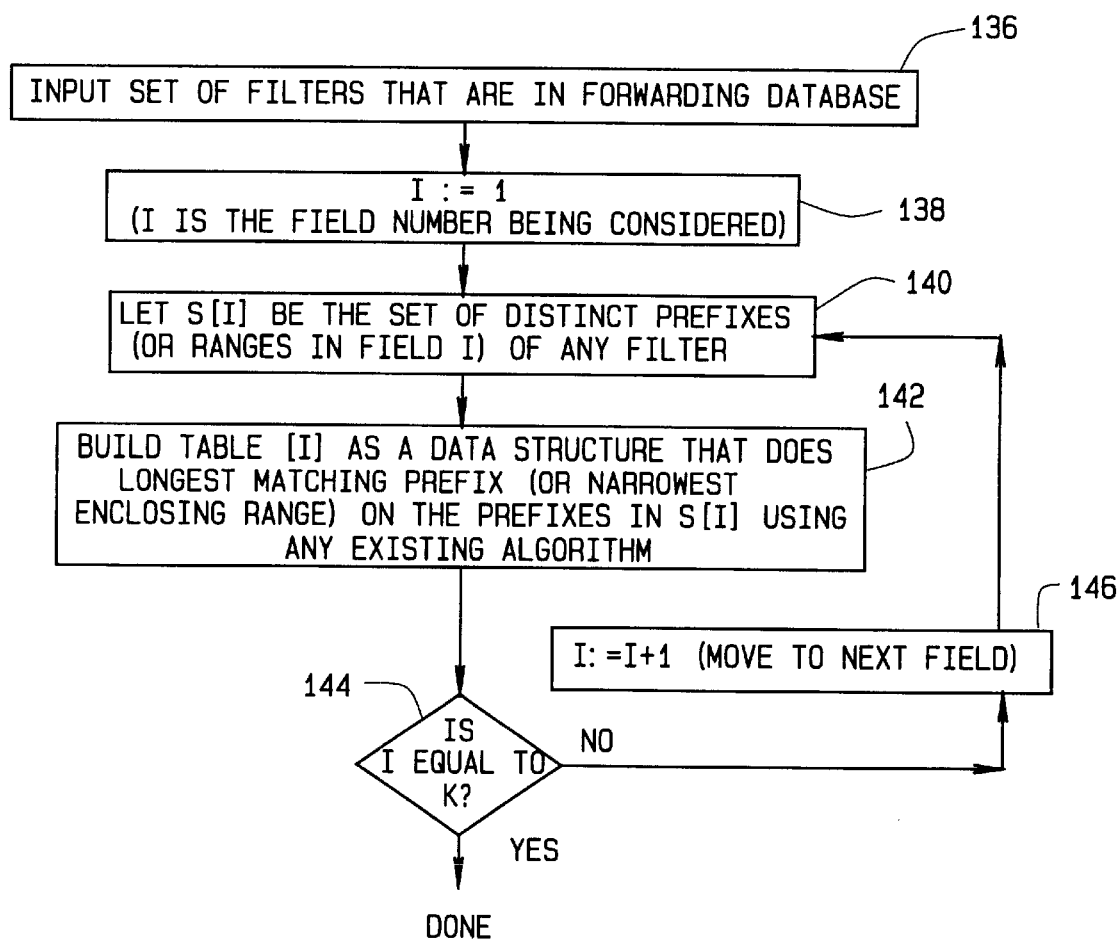
FIG. 16 is a flow chart describing a procedure to build data structures for a crossproducting search when using on demand computation.

If memory for CrossProductTable is limited, when the memory limits begin to be approached, crossproducts that have not been used for a while can be removed in favor of more recently used crossproducts. Doing so would require keeping a time stamp of the last time a crossproduct was consulted. FIG. 16 does not show the details of this, because the use of such time stamps is well-known to those skilled in the art.

Every match in a column $M_i$ of a sliced database constrains the set of filters that can match $M_i$. If the matching filters have only wildcard characters in certain columns, these columns need not be considered when forming crossproducts. The optimization technique that avoids matching such columns shall be referred to as "early stopping." For example, consider the case where there are three rules: the first $R_1$ specifies only a destination prefix 100* with remaining wildcarded fields, the second $R_2$ specifies only a destination prefix 011* and remaining wildcarded fields, the third $R_3$ specifies only a destination prefix 10* and source 01* and remaining wildcarded fields. When a match on the destination address field is performed and, for example, returns a match for 011*, it can be seen that there are no filters compatible with this match that have non-zero bits in the source address column. Thus, the crossproduct can be taken to be just the 011. It is thus not necessary to make crossproducts like 011, 01. Of course, several crossproduct tables become necessary, one for every subset of the fields.

To make this optimization work, certain precomputations must be performed for any match M in column i. Let Filt(M) be the set of filters whose i-th field is a prefix of M[i] (i.e., these are the filters in the database compatible with a match of M in column i). Next, let Fields(M) be the set of columns that contain non-empty fields in Filt(M). When a match with M in column i occurs, further matching can be restricted to columns specified in Fields(M) because all possibly matching filters will have empty (i.e., completely wildcarded) fields in the remaining columns. Fields(M) shall be referred to as "a set of fields to be searched in accordance with an early stopping search of the filter database."

Thus, depending on the set of matches obtained, certain columns may be ignored, reducing the number of prefix lookups in some cases. Also, the final set of columns considered is the set of columns that are common to Fields $(M_i)$ for every match $M_i$. Since different combinations of columns are possible depending on the matches obtained, it is necessary to have separate crossproduct tables for every possible combination of columns.

For example, in FIG. 12, suppose a packet is received specifying a destination port of 25. It will be seen that the only filters that are compatible with such a match are the first filter (that specifies 25 in the destination port field) and the last three filters (that have wildcards in the destination port field), All these four filters have the source address and source port fields wildcarded. Thus, Fields(25) will only include the first, third, and fifth column, and only crossproducts of these columns need be considered.

Notice that for 5 fields (as in IP headers), there are at most 32 final crossproduct tables. The net result should be considerably reduced memory; if used as a cache, this will result in a better hit rate as individual crossproducts will map onto more full headers.

It will thus be seen that, in general, early stopping will reduce the number of prefix matches required and the total number of crossproducts required.

Figure 18:
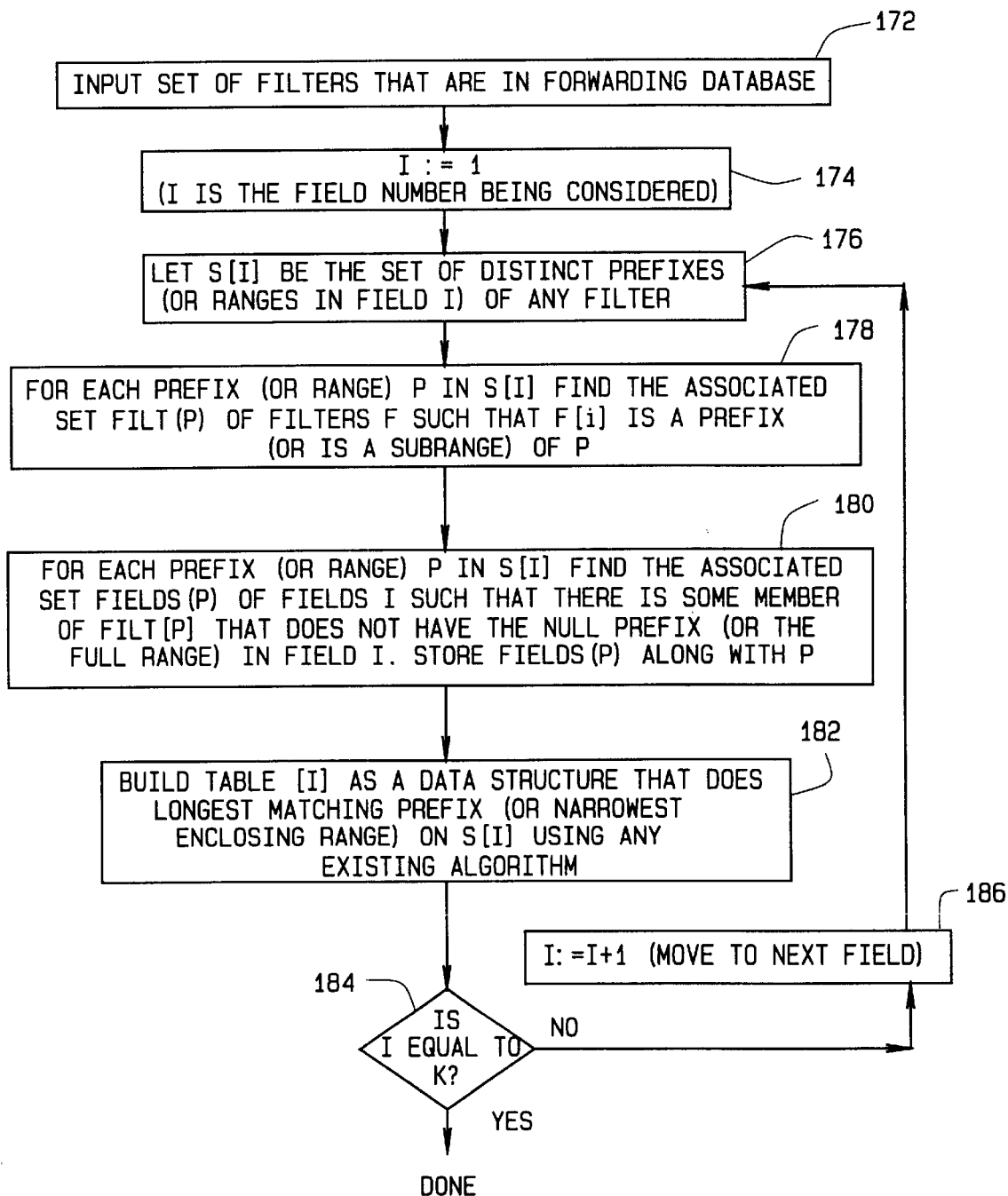
FIG. 18 is a flow chart describing the procedure that builds data structures for the crossproducting search procedure when using early stopping and on demand computation of crossproducts.

The data structure building procedure for on demand crossproducting with early stopping is shown in the flow chart of FIG. 18. This procedure is similar to that of on-demand crossproducting shown in FIG. 16. The data structures Table[I] is built as before and the CrossProductTable is not built. Thus, blocks 172, 174, 176, 182, 184, and 186 in FIG. 18 correspond to blocks 136, 138, 140, 142, 144, and 146 of FIG. 16. However, in the case of FIG. 18, for each entry P added to Table[I], the set of fields that are compatible with a match of P must be found in block 178. Fields(P) is stored along with P in Table[I] in block 180.

Figure 19:
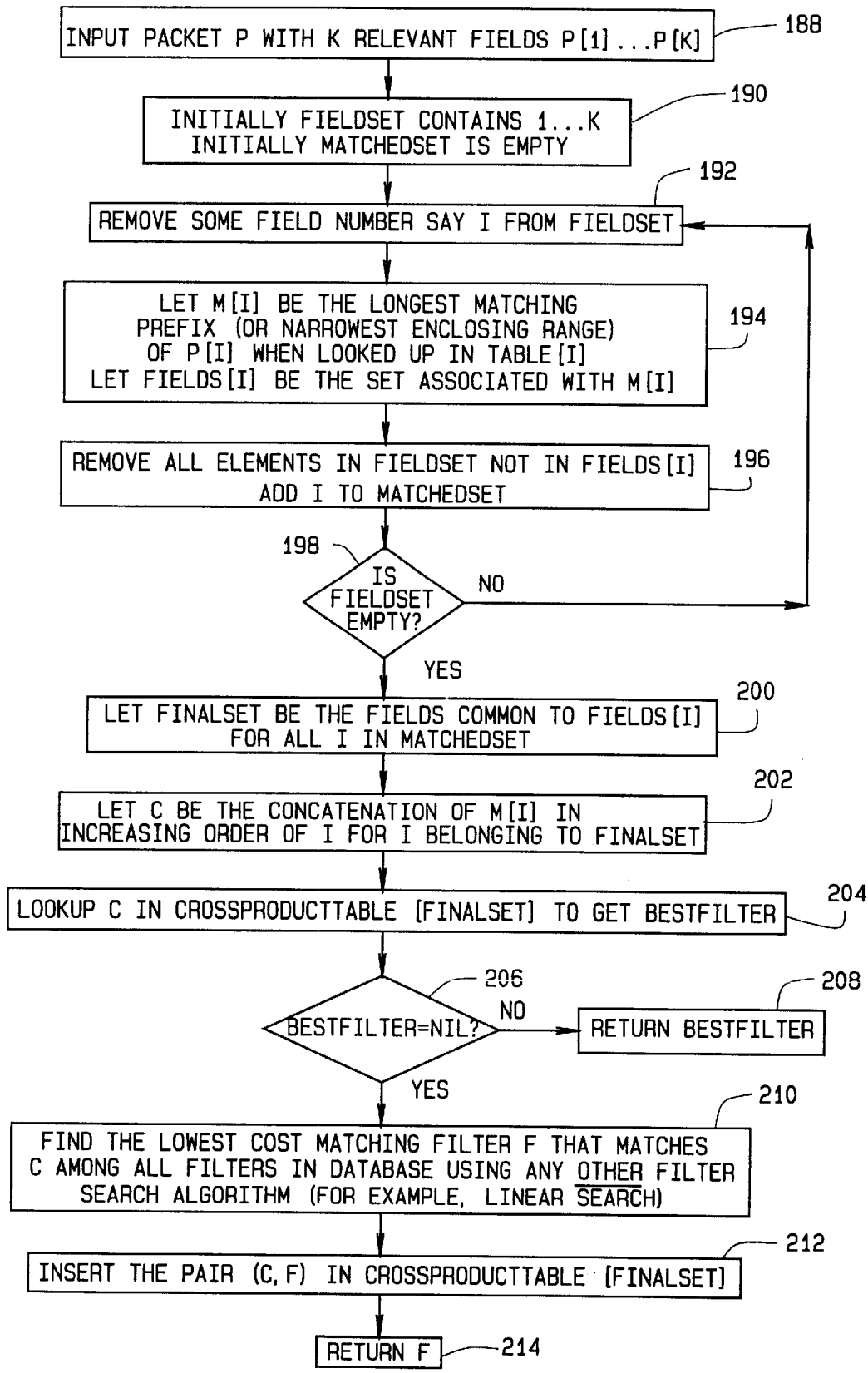
FIG. 19 is a flow chart describing the crossproducting search procedure on filters to compute the best matching filter of a data packet when using early stopping and on demand computation of crossproducts.

The new search procedure shown in FIG. 19 is a little different from the corresponding simple on demand search procedure shown in FIG. 17. Referring to FIG. 19, after inputting a packet P at block 188, two sets are initialized in block 190: a set FieldSet which contains possible fields to examine for a match (and is thus initialized to all possible fields from 1 . . . K) and a set MatchedSet which contains the fields that have been examined so far. (MatchedSet is thus initialized to empty).

Next, a field I from FieldSet is selected at block 192. (Implementations can optimize the choice of which field should be picked first in order to improve cross product efficiency.) The match M[I] for packet P in field I is found as before in blocks 192, 194, 196, and 198, but this time, the value of Fields stored along with M[I] is obtained and called Fields[I]. The set of fields left to be examined in FieldSet is then "pruned" in block 196 by removing all fields that are not in Fields[I] (because all possible filter matches only have pure wildcarded entries in these fields and so cannot contribute useful information to the crossproduct). I is also added to MatchedSet in block 196 to keep a record of the fields already matched. These steps are repeated until FieldSet is exhausted.

At this point, it is tempting to just concatenate the matches obtained and form the crossproduct. However, it is preferable to first find the fields that are common to all the sets Fields[I] for all I in MatchedSet, as shown in block 200. This set is called FinalSet. The reason why FinalSet may be smaller than MatchedSet (thereby causing crossproduct efficiency to be improved) is that some field J may have been examined before some other field K. J is thus added to MatchedSet but may not be in Fields(K). A naive procedure would consider J as well just because it happened to be examined before K. Although the prefix lookup of field J cannot be prevented, it can be prevented from being considered in the crossproduct. Improving crossproduct efficiency in this way can translate into improved cached performance for a given amount of memory because more packets will map into the same crossproduct.

Thus the final crossproduct is formed using the matched fields of the fields specified by FinalSet. The remainder of the procedure (blocks 202, 204, 206, 208, 210, 212, and 214) is almost identical to the bottom half (blocks 158, 160, 162, 164, 166, 168, and 170) of the simple on demand search procedure in FIG. 17. Crossproduct C is looked up. However, this time there must be a different CrossProduct table for each possible value of FinalSet (i.e., one for each possible subset of 1 . . . K in the worst case). Similarly, if the result is not found and must be computed, the newly computed value is inserted in the appropriate crossproduct table.

Since rules that only specify a destination prefix are a special case, it is clear that Internet best matching prefix lookups (henceforth IP lookups) are a special case of firewall lookups. IP addresses can be sliced into columns in a manner similar to that discussed with respect to firewalls in FIG. 11. Crossproducting can then be performed on the individual columns. In other words, the column widths of an IP address can be fixed, for example, at 8, 8, 8, 8. A given prefix in the database can then have up to 4 components. The crossproducts of the components of every prefix in the database can then be computed.

Figure 20:
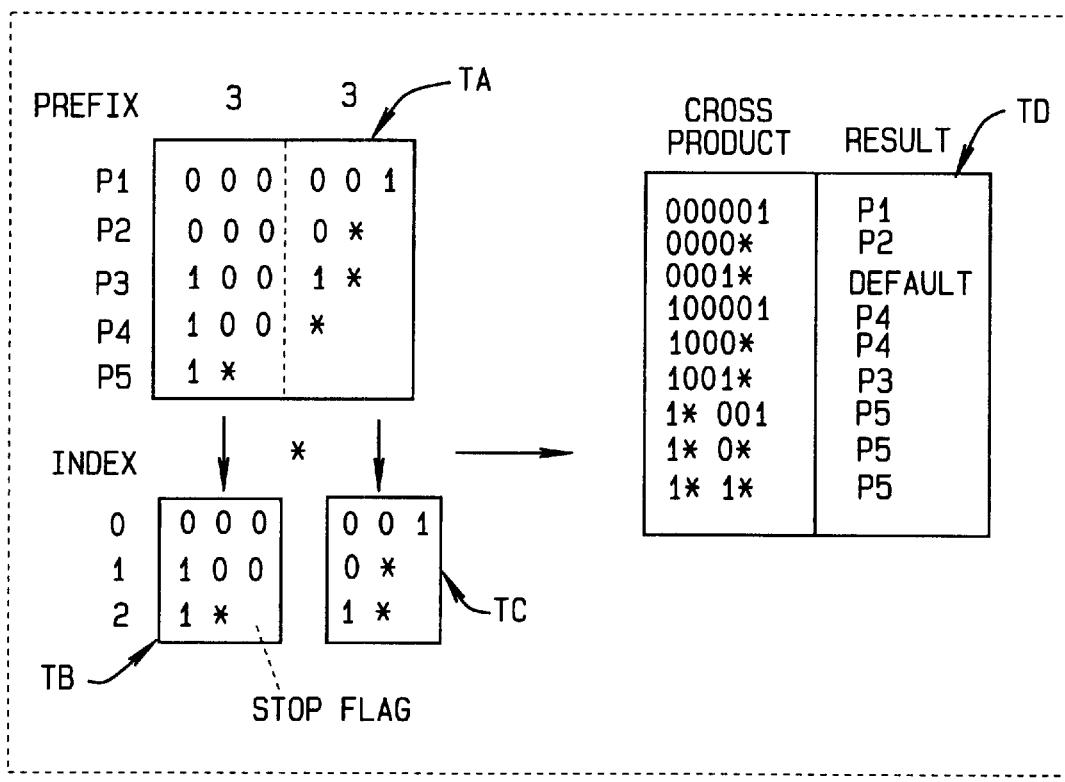
FIG. 20 is a representation of how an IP database is sliced and crossproducts are calculated, showing a sample database sliced into two 3-bit columns, each having three distinct values, leading to a total of nine distinct crossproducts with their accompanying precomputed results.

To make this clearer, consider the example illustrated in FIG. 20. Table TA in FIG. 20 is an example containing 5 IP prefixes. For simplicity, it is assumed in this example that address are 6 bits long and that prefixes are sliced into two 3 bit columns exactly as was done for the firewall database. Notice that the left column (first 3 bits) of table TA yields only 3 distinct values (table TB of FIG. 20) because the values 000 and 100 are repeated. Similarly, the right column of table TA yields only 3 distinct values (table TC of FIG. 20)). Finally, table TD in FIG. 20 shows the 9 possible cross products. As before, the best matching prefix associated with every crossproduct can be precomputed.

If columns less than 16 bits wide are chosen, the normal best matching prefix used in crossproducting (for each column) can be replaced by an array lookup. If the arrays are small enough (especially for columns less than 8 bits), all arrays will fit in cache. This yields very fast column lookups, and avoids an apparent recursion problem.

Figure 21:
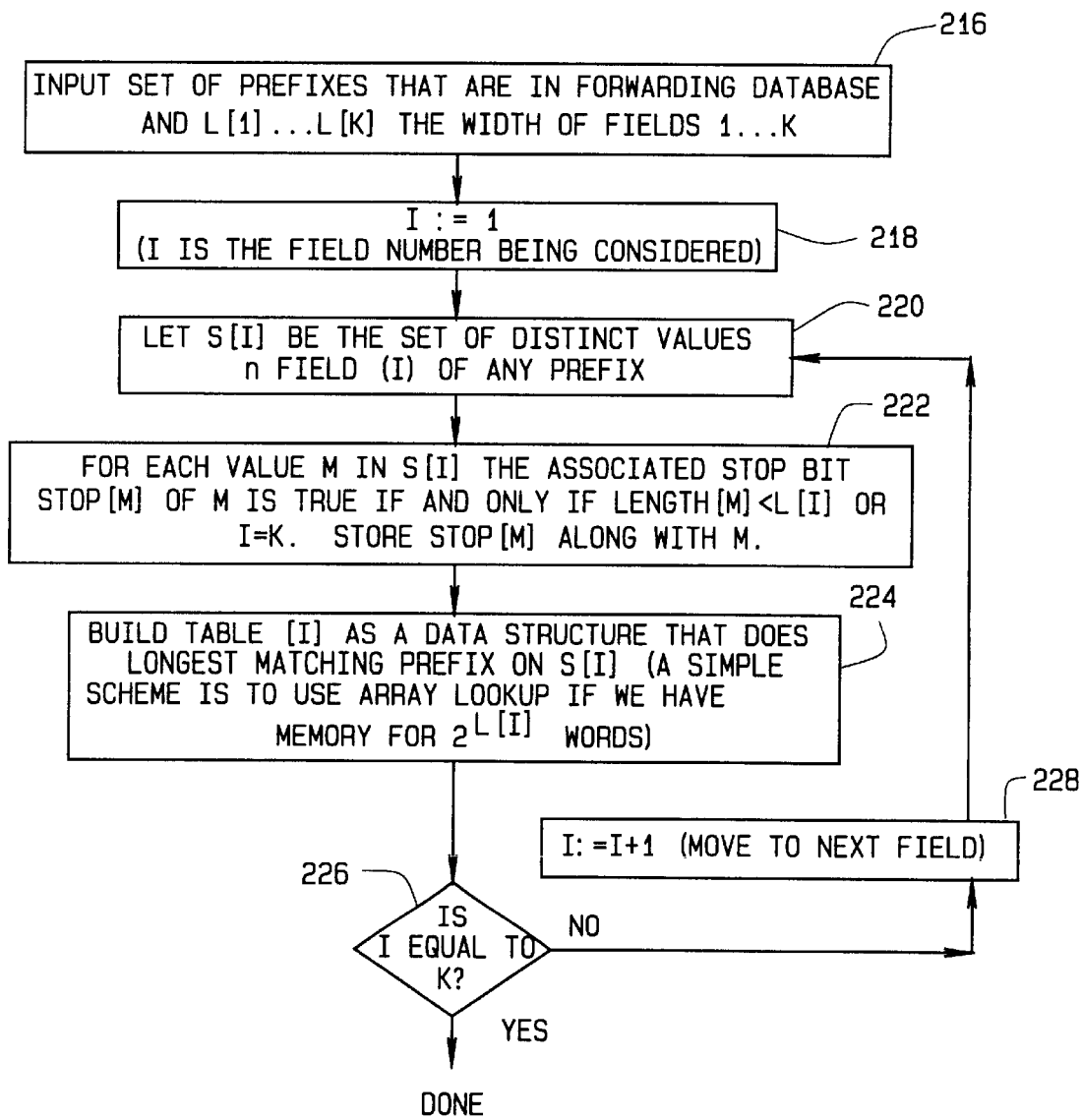
FIG. 21 is a flow chart describing the building of data structures for a crossproducting search when applied to a longest matching prefix lookup.

The building procedure that is used for crossproducting when applied to normal Internet IP addressing is shown in FIG. 21. This procedure (blocks 216, 218, 220, 222, 224, 226, and 228) is similar to that shown in FIG. 18 (at blocks 172, 174, 176, 178, 180, 182, 184 and 186) except that Fields [M] for each value M is much simpler and can be replaced by a stop bit Stop[M]. The input to the build procedure at block 216 is a set of prefixes that specifies the way a destination address is to be sliced into fields by specifying the fields widths (in bits) L[1]. . . L[K] of the fields 1 . . . K. Stop[M] can be calculated very simply: if M belongs to field I and does not "fit" completely into the width of field I, then set the stop bit to true. The other case when this can be done is for the last field K.

As an example, consider a case having only two IP addresses $D_1=1^*$ and $D_2=1101^*$ and two fields of length two bits each. Then the possible values in field 1 (first two bits of each prefix), are $1^*$ and 11. The $1^*$ should have the stop bit set because its length is 1, which is strictly less than the width of the field (two bits). The stop bit can be set even when the length of M is exactly equal to the field length but there are no other compatible filters with non-wildcarded fields in later columns. For example, if $D_3=10^*$ were added to the database, the stop bit corresponding to the value 10 in field 1 can also have the stop bit set. This is not shown in FIG. 21, though it follows from the more general definition of Fields(M).

Figure 22:
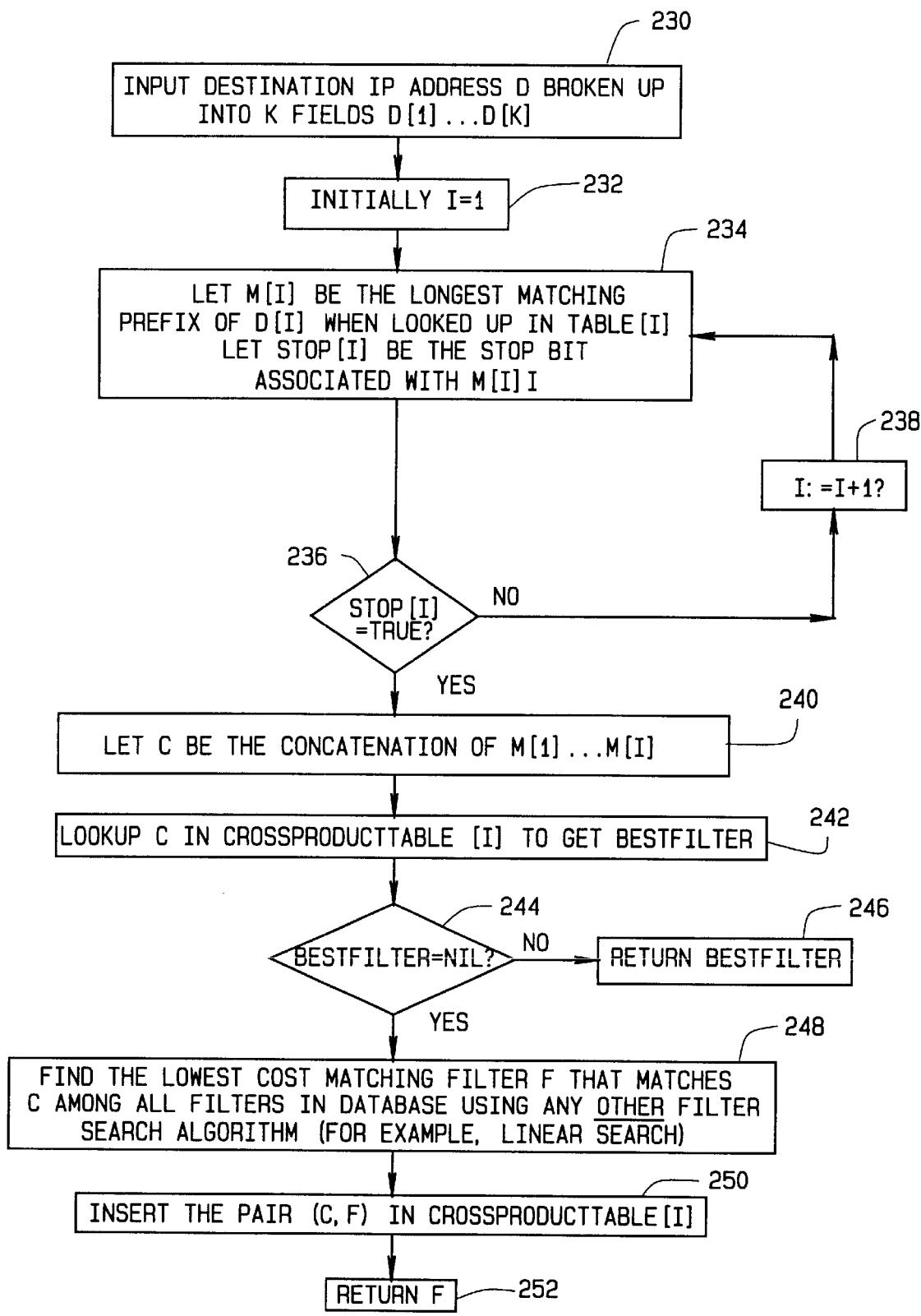
FIG. 22 is a flow chart describing the crossproducting search procedure when applied to longest matching prefix search.

The search procedure shown in the flow chart of FIG. 22 is similar to the on-demand search algorithm of FIG. 17 except that when searching for a match in column i at block 234, a stop bit is obtained along with M[I]. If the stop bit is true, the search is terminated without looking at further fields, and the crossproduct is formed using the first I matches at block 240. Next, the crossproduct is looked up in one of K crossproduct tables at block 242, one for each possible value of I. In case the result is not found, it is added to the appropriate crossproduct table at block 250. This procedure is a special case of the more general Early Stopping algorithm of FIG. 19 specialized to prefixes.

Figure 23:
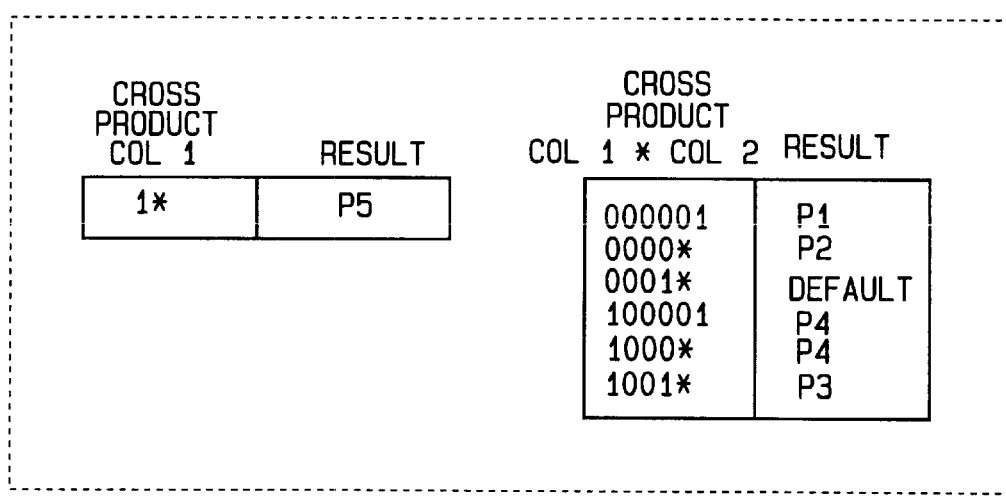
FIG. 23 is a representation of crossproducts and results showing early stopping optimization for an IP lookup example.

Making several crossproduct tables actually reduces storage considerably. This is illustrated in FIG. 23 for the database of FIG. 20. Notice that the number of crossproducts has been reduced from 9 to 7. By actual measurements, early stopping was found to be crucial in allowing reasonable storage.

A further optimization can be performed by replacing the hash lookup of the crossproduct table with an indexed lookup. Each column lookup can return a column index. The index into the crossproduct table can be calculated using the column indices. For example, consider looking up the address 100000 in FIG. 20. Lookup of 100 in column 1 yields 100 with column index (i.e., position in column numbered starting from 0) 1. Lookup of 001 yields 0* with column index 1. Because there are 3 elements in column 2, the composite index becomes 3*1+1=4. This is indeed the index of the crossproduct entry 1000\* in the crossproduct table of FIG. 20 (assuming indices start at 0).

One advantage of crossproducting for IP lookups (or filters) is that it allows a straightforward parallel implementation. Given separate memory banks, each column lookup can proceed in parallel. Even if there are stop bits, a simple priority encoder can find the position of the leftmost stop bit and then use that to calculate the appropriate crossproduct index. The crossproduct index can then be used for an index into the final table. The parallel column lookups and the final crossproduct lookup can be pipelined to allow IP lookups at the speed of a memory access. If small width columns are used (e.g., 8 bits), the column memory can even fit into the on-chip memory of a chip.

It is also possible to use on demand building of the IP lookup crossproducts and use the crossproduct table as a cache. This would be a further advantage by itself because we know of no previously reported way to cache IP lookups other than on a full address basis. Crossproduct caching has a better hit rate.

Earlier, it was noted that conventional caching based on full headers was not every effective. However, caching based on crossproducting is surprisingly effective. Turning to FIG. 12, consider a series of web accesses to the external network from an internal site. Assume the internal site accesses external destination addresses $D_i, \ldots D_M$. All these addresses (see FIG. 11) will correspond to the two crossproduct terms default, Net, default, default, TCP-ACK and default, Net, default, default, default (the second term corresponds to the TCP-ACK bit not being set). However, caching based on full headers will yield 2M cached headers rather than 2 cached crossproducts. Thus, the hit rate of the crossproduct cache should be much higher than standard header caches (or even plain destination address caches keyed on full IP addresses).

Although described in conjunction with specific preferred embodiments, it will be recognized by those skilled in the art that the inventive devices and methods described herein are applicable to a wide range of systems, including, but not limited to, IP routing systems, firewall systems, and digital telephony systems. In addition, it will be apparent that many modifications, generalizations and adaptations within the scope of this invention may be made by those skilled in the art. By way of example only, one such generalization applicable to QoS (Quality of Service) routing is that two packets with different priorities may be sent to the same data link, but to different queues. In addition, firewall blocking can be considered as a data link queue, where the data link is a null link. Therefore, where the claims recite an "output link," this term should be considered as encompassing any link to which data is directly sent as well as a particular queue of a link having one or more queues. It should thus be evident that the scope of the invention should be determined by reference to the claims appended below, as read and interpreted in conjunction with the specification, and in accordance with the full range of equivalences encompassed by the claims under applicable law.

What is claimed is:

1. A method for routing a data packet applied to an input port of an electronic router, the data packet including routing information comprising a plurality of routing fields, said plurality of routing fields including a destination address field containing a destination address, and the electronic router having a plurality of outputs, each output corresponding to an output link, and a routing database including filter entries, each filter entry having a corresponding cost and an associated output link, the routing database comprising a plurality of sub-databases and a crossproduct database, each sub-database corresponding to a different routing field of a data packet and including prefix filters encompassing all possible values of routing fields corresponding to the sub-databases, and the crossproduct database comprising a database of output data links corresponding to crossproduct terms of prefixes contained in the crossproduct database;

said method comprising the steps of:

(a) operating the router to perform a crossproducting search on the routing information included in the data packet to find a least-cost matching filter in the routing database and its corresponding output link, said operating step comprising:

searching for one of a longest matching prefix or a narrowest enclosing range for each routing field in the data packet in sub-databases corresponding to the routing fields, each search producing a search result;

concatenating the search results into a crossproduct term; and searching for an output link corresponding to the crossproduct term in the crossproduct database; and (b) routing the data packet to an output of the router corresponding to the output link found in the crosproducting search.

2. The method of claim 1 and further comprising:

determining whether the search for the output link corresponding to the crossproduct term fails to find an output link;

if no output link was found, computing an earliest matching filter associated with the crossproduct term; and associating an output link corresponding to the earliest matching filter found in the computing step with the crossproduct term in the crossproduct database.

3. The method of claim 2 wherein the step of computing an earliest matching filter associated with the crossproduct term comprises a search of a routing database other than a crossproduct search.

4. The method of claim 3 wherein the search other than a crossproduct search is a linear search.

5. The method of claim 1 and further comprising:

selecting an output link L as a default output link; and removing all crossproduct terms specifying L as an output link from the crossproduct database;

and wherein the step of operating the routes comprises selecting L as an output link to route the data packet when the crossproducting search does not find a least-cost matching filter.

6. The method of claim 1 and further comprising:

partitioning the routing database into a plurality of segments;

and wherein the steps of (i) searching for one of a largest matching prefix or a narrowest enclosing range, (ii) concatenating the search results, and (iii) searching for an output link are performed for each of the plurality of segments;

and further comprising selecting the least-cost matching filter from the output links obtained from each segment search.

7. A method for routing a data packet applied to an input port of an electronic router, the data packet including routing information comprising a plurality of routing fields, said plurality of routing fields including a destination address field containing a destination address, and the electronic router having a plurality of outputs, each output corresponding to an output link, and a routing database including filter entries, each filter entry having a corresponding cost and an associated output link, the routing database comprising a plurality of sub-databases and a crossproduct database, each sub-database corresponding to a different routing field of a data packet and including prefix filters encompassing all possible values of routing fields corresponding to the sub-databases, the prefix filters having prefixes and each prefix in the sub-database having an associated set of fields Fields[mm] remaining to be searched in accordance with an early stopping search of the routing database, said method comprising the steps of:

(a) operating the router to perform a crossproducting search on the routing information included in the data packet to find a least-cost matching filter in the routing database and its corresponding output link, said operating step comprising:

i) initializing a set FieldSet of fields to a set of all routing fields to be searched for a match and an empty set MatchedSet;

ii) selecting a field I from FieldSet;

iii) searching the sub-database corresponding to field I for a prefix match $M_i$ of field I with the data packet, and for the set of fields Fields[$M_i$] associated with prefix match $M_i$;

iv) removing all fields from the set FieldSet that are not contained in set Fields[$M_i$];

v) adding field I to the set MatchedSet;

vi) repeating steps i through v until the set FieldSet is exhausted;

vii) concatenating the prefix matches $M_i$ found in the searches to form a crossproduct term; and viii) searching for an output link corresponding to the crossproduct term in the crossproduct database; and (b) routing the data packet to an output of the router corresponding to the output link found in the crossproducting search.

8. The method of claim 7 and further comprising:

determining whether an output link corresponding to the crossproduct term was found in the crossproduct database;

if no output link was found, computing an earliest matching filter F associated with the crossproduct term; and associating an output link corresponding to the earliest matching filter found in the computing step with the crossproduct term in the crossproduct database.

9. A method for routing a data packet applied to an input port of an electronic router, the data packet including routing information comprising at least a destination address field containing a destination address, and the electronic router having a plurality of outputs, each output corresponding to an output link, and a routing database including filter entries, each filter entry having a corresponding cost and an associated output link, wherein the database comprises a plurality of sub-databases, said method comprising the steps of:

(a) operating the router to perform a crossproducting search on the routing information included in the data packet to find a least-cost matching filter in the routing database and its corresponding output link, said operating step comprising:

slicing each destination address of a data packet into fields of a predetermined length corresponding to a length of fields in corresponding sub-databases;

searching for one of a longest matching prefix or a narrowest enclosing range of each sliced portion of each destination address in sub-databases corresponding to the sliced portions to generate search results;

concatenating the search results of the searching steps for the data packet into a crossproduct term; and searching for an output link corresponding to each crossproduct term in a crossproduct table; and (b) routing the data packet to an output of the router corresponding to the output link found in the crossproducting search.

10. The method of claim 8 and further comprising:

determining whether an output link is found in the step of searching for an output link;

if no output link is found, performing a longest prefix match to associate an output link to the crossproduct having an output link that was not found; and associating, in the crossproduct table, the output link found by performing the longest prefix match with the crossproduct having an output link that was not found.

11. A device for routing data packets including routing information comprising a plurality of routing fields, said device comprising:

a routing database comprising a plurality of sub-databases, each sub-database corresponding to a different routing field of said data packets and including prefix filters encompassing all possible values of routing fields corresponding to the sub-databases;

at least one input for receiving data packets;

a plurality of output links;

means responsive to received data packets for performing a crossproducting search, in the routing database, of the routing information in the data packet to find a least-cost matching filter in the routing database, wherein the means for performing a crossproducting search comprises: (1) a cross-product database; (2) means responsive to the routing fields of the data packets for searching for one of a longest matching prefix or a narrowest enclosing range for each routing field of the data packets in the sub-databases corresponding to the routing fields, each search thereby producing a search result; (3) means for concatenating the search results into a crossproduct term; and (4) means for searching for an output link corresponding to the crossproduct term in the crossproduct database; and means responsive to the least-cost matching filters to route each data packet to a corresponding one of the plurality of outputs.

12. The device of claim 11 further comprising:

means for determining whether the means for searching for the output link has succeeded in finding an output link;

means, responsive to the determining means, for computing, from information contained in the routing database, an earliest matching filter associated with the crossproduct term; and means for associating an output link corresponding to the earliest matching filter found by the computing means with the crossproduct term produced by the concatenation means.

13. A routing system for data packets, the data packets comprising a plurality of fields, the routing system comprising:

a plurality of input links for receiving incoming data packets;

a plurality of output links for dispatching outgoing data packets;

a switch interconnected between said input data links and said output links and adapted to selectively connect one of said input links to one of said output links; and a data processor coupled to said adjustable switch and having means for controlling said switch, said data processor including a database of filters each having an associated filter cost, and each of said filters having a prefix on a set of selected packet fields and an association with an output link for routing an incoming data packet, said data processor also including means for accessing said database for matching of data packet fields with said filters in said database, said means for controlling said switch being responsive to a match of said data packet fields with one of said filters in said database to thereby route a data packet received at one of the input links to the output links in accordance with the matching filter.

14. The routing system of claim 13 wherein said accessing means includes means for performing a crossproducting search to match fields in a received data packet with an earliest matching filter.

15. The routing system of claim 14 wherein the filter database is configured as a plurality of sub-databases, one for each field for matching in a received data packet, and further wherein each of the plurality of sub-databases contains all possible prefix values of its corresponding field for matching in any filter, and wherein each prefix contains a set of fields and a crossproducting database, the means for performing a crossproducting search comprising:

means for searching for one of a longest matching prefix or a narrowest enclosing range of each field for matching in a received data packet, in any one of the sub-databases corresponding to the searched field, said means for searching producing a search result upon completion of a search;

means for concatenating the search results from the means for searching into a crossproduct term; and means for searching a crossproduct table for an output link corresponding to the crossproduct term.

16. The routing system of claim 14 and further comprising:

means for determining whether a search of a crossproduct table for an output link corresponding to the crossproduct term yielded no output link corresponding to the crossproduct term;

means responsive to the determining means, for computing an earliest matching filter associated with the crossproduct term that yielded no output link; and means for storing an output link associated with the computed earliest matching filter in the crossproduct table in an entry associated with the crossproduct term that yielded no output link.

17. The routing system of claim 14 wherein the filter database is configured as a plurality of sub-databases, one for each field for matching in a received data packet, and further wherein each of the plurality of sub-databases contains all possible prefix values of its corresponding field for matching in any filter, and wherein each prefix contains a set of fields and a crossproducting database, and wherein the means for performing a crossproducting search comprises:

means for initializing a set of fields to be searched to contain all fields for matching in a received data packet;

means for removing a field F from the set of fields to be searched and for finding one of a longest matching prefix or a narrowest enclosing range P of field F in a received packet in a sub-database corresponding to field F to obtain a set of search results;

means for removing all fields in the set of fields to be searched that are not in a set of fields associated with P;

means for forming a final set of fields consisting of fields common to sets stored with each prefix P;

means for concatenating the search results corresponding to fields in the final set to obtain a crossproduct term;

means for searching for an output link corresponding to the crossproduct term in a crossproduct table;

means for determining whether the searching means has found an output link corresponding to the crossproduct term as a result of a search;

means, responsive to the determining means, for computing an earliest matching filter associated with the crossproduct term searched by the determining means; and means for storing the earliest matching filter found by the computing means in the crossproduct table corresponding to the crossproduct term searched by the determining means.

* * * * *